US008446972B2

(12) United States Patent
Yamada et al.

(10) Patent No.: US 8,446,972 B2
(45) Date of Patent: May 21, 2013

(54) COMMUNICATION SYSTEM, RECEPTION DEVICE, AND COMMUNICATION METHOD

(75) Inventors: Ryota Yamada, Osaka (JP); Takashi Yoshimoto, Osaka (JP); Kazuyuki Shimezawa, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 206 days.

(21) Appl. No.: 12/934,186

(22) PCT Filed: Apr. 24, 2009

(86) PCT No.: PCT/JP2009/058168
§ 371 (c)(1),
(2), (4) Date: Sep. 23, 2010

(87) PCT Pub. No.: WO2009/133816
PCT Pub. Date: Nov. 5, 2009

(65) Prior Publication Data
US 2011/0019757 A1  Jan. 27, 2011

(30) Foreign Application Priority Data

Apr. 30, 2008 (JP) ................................ P2008-119287

(51) Int. Cl.
*H04K 1/10* (2006.01)

(52) U.S. Cl.
USPC ........... 375/260; 375/133; 375/141; 375/148; 375/144; 375/264; 375/267; 375/347; 375/346; 375/349; 375/E1.029; 375/E1.032; 455/101; 455/103; 455/63.1; 455/132; 455/105; 455/135; 455/134; 455/226.1; 455/226.4; 455/115.3

(58) Field of Classification Search
CPC .... H04B 1/707; H04B 1/7117; H04B 1/71151; H04B 1/23; H04B 1/713; H04L 27/2647; H04L 1/0618; H04L 1/06
USPC .............. 455/101, 103, 105, 115.3, 135, 134, 455/226.1–226.4; 375/133, 141, 148, 144, 375/260, 264, 267, 346, 347, 349, E1.029, 375/E1.032
See application file for complete search history.

(56) References Cited

U.S. PATENT DOCUMENTS 7,991,360 B2 * 8/2011 Kawamoto et al. ............. 455/65
2005/0013350 A1 * 1/2005 Coralli et al. .................. 375/148

(Continued)

FOREIGN PATENT DOCUMENTS

CN          1965518 A      5/2007
EP      2 023 518 A1      2/2009

(Continued)

OTHER PUBLICATIONS

Gesbert et al., "From Theory to Practice: an Overview of MIMO Space-Time Coded Wireless Systems", IEEE Journal on Selected Areas in Communications, vol. 21, No. 3, Apr. 2003, pp. 281-302.
Imamura et al., "A Proposal of SC/MMSE MC-CDM Turbo Equalizer using Block Division Scheme based on Times of Arrival of Multi-path Signals", IEICE Technical Report, vol. 106, No. 168, Jul. 12, 2006, pp. 79-84, RCS2006-72.

(Continued)

*Primary Examiner* — Daniel Washburn
*Assistant Examiner* — Rahel Guarino
(74) *Attorney, Agent, or Firm* — Birch, Stewart, Kolasch & Birch, LLP

(57) ABSTRACT

A reception device which communicates with a transmission device including multiple transmission antennas, the reception device including: at least one reception antenna which receives multiple transmission signals transmitted by the transmission device from the multiple transmission antennas; a propagation channel response estimation unit which estimates propagation channel responses among the multiple transmission antennas and the reception antenna; a block division unit which divides a reception signal of at least one of the reception antennas into multiple blocks based on a multipath; and a transmission signal detection unit which detects the transmission signals transmitted by the transmission device based on the reception signal divided by the block division unit into the multiple blocks and the propagation channel responses estimated by the propagation channel response estimation unit. The transmission signal detection unit includes: an interference cancellation unit and a signal separation unit.

10 Claims, 12 Drawing Sheets

U.S. PATENT DOCUMENTS

| | | |
|---|---|---|
| 2005/0249319 A1 | 11/2005 | Suh et al. |
| 2009/0262853 A1 | 10/2009 | Yoshida et al. |
| 2010/0158080 A1 | 6/2010 | Yamada et al. |

FOREIGN PATENT DOCUMENTS

| | | |
|---|---|---|
| EP | 2 023 519 A1 | 2/2009 |
| EP | 2 169 860 A1 | 3/2010 |
| EP | 2 173 046 A1 | 4/2010 |
| EP | 2 178 233 A1 | 4/2010 |
| EP | 2 204 933 A1 | 7/2010 |
| WO | 2007/119280 A1 | 10/2007 |
| WO | 2007/136056 A1 | 11/2007 |
| WO | 2007/139145 A1 | 12/2007 |
| WO | 2008/146713 A1 | 12/2008 |
| WO | 2008/155947 A1 | 12/2008 |
| WO | 2009/001853 A1 | 12/2008 |
| WO | 2009/020148 A1 | 2/2009 |
| WO | 2009/031649 A1 | 3/2009 |

OTHER PUBLICATIONS

Shimezawa et al., "Performance Evaluation of Turbo Equalizer using Block Division Scheme for MC-CDM", Proceedings of the 2007 IEICE General Conference Tsushin 1, Mar. 7, 2007, p. 530, B-5-116.

Yamada et al., "Performance Comparison of MC-CDM Systems with Frequency and Time Domain Iterative MCI Canceller for Delay Spread", IEICE Communications Society Conference 2007 Koen Ronbunshu 1, Aug. 29, 2007, p. 376, B-5-54.

Yoshimoto et al., "An SC/MMSE Turbo Equalization using Multipath Division Scheme for OFDM Systems in Clustered Multipath Environments with large delay", Proceedings of the 2008 IEICE General Conference 1, Sep. 2, 2008, p. 341, B-5-28.

Pierre-jean Bouvet, et al. Spatial Multiplexed Coded MC-CDMA with Iterative Receiver, Personal, Indoor and Mobile Radio Communications, 2004. PIMRC 2004, Sep. 8, 2004, vol. 2, pp. 801-804.

* cited by examiner

COMMUNICATION SYSTEM, RECEPTION DEVICE, AND COMMUNICATION METHOD

TECHNICAL FIELD

The present invention relates to a communication system, a reception device, and a communication method.

This application claims priority to and the benefits of Japanese Patent Application No. 2008-119287 filed on Apr. 30, 2008, the disclosure of which is incorporated herein by reference.

BACKGROUND ART

Recently, in the field of wireless communication, multiple input multiple output (MIMO) systems which transmit multiple independent transmission signals from a radio transmission device to a radio reception device at the same frequency and timing so as to implement high speed transmission have been attracting attention. MIMO may increase the transmission rate without increasing the frequency bandwidth.

In the MIMO systems, different transmission signals are multiplexed and received by a radio reception device. Thus, technology for separating spatially multiplexed transmission signals is necessary for the radio reception device.

FIG. 12 is a schematic diagram showing a conventional MIMO system. The MIMO system includes a radio transmission device 51 and a radio reception device 52.

The radio transmission device 51 includes T (T is an integer greater than or equal to 2) transmission antennas $A_{s1}$ to $A_{sT}$. The radio transmission device 51 transmits different transmission signals $s_1$ to $s_T$ from the transmission antennas $A_{s1}$ to $A_{sT}$ to the radio reception device 52.

The transmission signals $s_1$ to $s_T$ transmitted from the transmission antennas $A_{s1}$ to $A_{sT}$ of the radio transmission device 51 are received by R (R is an integer greater than or equal to 1) reception antennas $A_{r1}$ to $A_{rR}$ provided in the radio reception device 52. At this time, transmission and reception signals of the MIMO system may be expressed as shown in Equations (1) to (5).

$$r = Hs + n \quad (1)$$

$$r = [r_1 \cdots r_R]^T \quad (2)$$

$$H = \begin{pmatrix} h_{11} & \cdots & h_{1T} \\ \vdots & \ddots & \vdots \\ h_{R1} & \cdots & h_{RT} \end{pmatrix} \quad (3)$$

$$s = [s_1 \cdots s_T]^T \quad (4)$$

$$n = [n_1 \cdots n_R]^T \quad (5)$$

In this regard, a vector r of the left side of Equations (1) and (2) is an (R rows×1 column) reception signal vector having, in elements, reception signals received by the respective reception antennas $A_{r1}$ to $A_{rR}$ of the radio reception device 52.

A vector H of the left side of Equation (3) is an (R rows×T columns) propagation channel matrix having, in elements, propagation channel responses $h_{11}, \ldots, h_{R1}, \ldots, h_{1T}, \ldots,$ and $h_{RT}$ among the transmission antennas $A_{s1}$ to $A_{sT}$ of the radio transmission device 51 and the reception antennas $A_{r1}$ to $A_{rR}$ of the radio reception device 52.

Here, $h_{11}$ is a propagation channel response between the transmission antenna $A_{s1}$ and the reception antenna $A_{r1}$. $h_{R1}$ is a propagation channel response between the transmission antenna $A_{s1}$ and the reception antenna $A_{rR}$.

Also, $h_{1T}$ is a propagation channel response between the transmission antenna $A_{sT}$ and the reception antenna $A_{r1}$. $h_{RT}$ is a propagation channel response between the transmission antenna $A_{sT}$ and the reception antenna $A_{rR}$.

The right superscript T of a matrix indicates a transpose matrix of the matrix.

A vector s of the left side of Equation (4) is a (T rows×1 column) transmission signal vector having, in elements, transmission signals transmitted by the respective transmission antennas $A_{s1}$ to $A_{sT}$ of the radio transmission device 51.

A vector n of the left side of Equation (5) is an (R rows×1 column) noise vector having, in elements, noise added to the respective reception antennas $A_{r1}$ to $A_{rR}$ of the radio reception device 52.

A linear process is known as a technique of separating signals spatially multiplexed as shown in Equation (1). For example, the linear process is zero forcing detection (ZFD) or minimum mean square error detection (MMSED).

The linear processes are widely used since a calculation amount is small. The above-described MIMO system is disclosed in Non-Patent Document 1.

To obtain good transmission characteristics using the above-described linear process like ZFD or MMSED, it is preferable that the relationship of $M \leq N$ should be established between the number of transmission antennas, M, of the radio transmission device 51 and the number of reception antennas, N, of the radio reception device 52. If M>N, the transmission characteristics are significantly degraded.

To avoid this problem, it is desirable to increase the number of reception antennas of the radio reception device 52. However, if the radio reception device 52 is a small-size radio reception device, there is a problem in that it is difficult to increase the number of reception antennas since the number of reception antennas capable of being mounted is limited.

Non-Patent Document 1: D. Gesbert, M. Shafi, D. Shiu, P. J. Smith, A. Naguib, "From Theory to Practice: an overview of MIMO space-time coded wireless systems", IEEE JSAC, April 2003

DISCLOSURE OF INVENTION

Problem to be Solved by the Invention

The present invention has been made in view of the above-described circumstances, and an object of the invention is to provide a communication system, a reception device, and a communication method that can obtain good transmission characteristics between a transmission device and a reception device without increasing the number of reception antennas of the reception device.

Means for Solving the Problem (1) The present invention has been made to solve the above-described problems. According to an aspect of the present invention, there is provided a communication system including a transmission device and a reception device, wherein the transmission device includes: multiple transmission antennas; and a transmission unit which transmits multiple transmission signals from the multiple transmission antennas to the reception device, and the reception device includes: at least one reception antenna which receives the multiple transmission signals transmitted by the transmission unit; a propagation channel response estimation unit which estimates propagation channel responses among the multiple transmission antennas and the reception antenna; a block division unit which divides a reception signal of at least one of the reception antennas into multiple blocks based on a multipath; and a transmission signal detection unit which detects the transmission signals transmitted by the transmission device based on the reception signal divided by the block division unit into the multiple blocks and the propagation channel responses estimated by the propagation channel response estimation unit, wherein the transmission signal detection unit includes: an interference cancellation unit which generates and removes an interference replica; and a signal separation unit which separates a signal into which a transmission signal is multiplexed from an output of the interference cancellation unit.

(2) According to another aspect of the present invention, there is provided a reception device which communicates with a transmission device including multiple transmission antennas, the reception device including: at least one reception antenna which receives multiple transmission signals transmitted by the transmission device from the multiple transmission antennas; a propagation channel response estimation unit which estimates propagation channel responses among the multiple transmission antennas and the reception antenna; a block division unit which divides a reception signal of at least one of the reception antennas into multiple blocks based on a multipath; and a transmission signal detection unit which detects the transmission signals transmitted by the transmission device based on the reception signal divided by the block division unit into the multiple blocks and the propagation channel responses estimated by the propagation channel response estimation unit, wherein the transmission signal detection unit includes: an interference cancellation unit which generates and removes an interference replica; and a signal separation unit which separates a signal into which a transmission signal is multiplexed from an output of the interference cancellation unit.

(3) In the reception device according to the aspect of the present invention, the reception device may further include: a likelihood calculation unit which calculates bit likelihoods from the reception signal received by the reception antenna; and a reception replica signal generation unit which generates reception replica signals based on the propagation channel responses estimated by the propagation channel response estimation unit and the bit likelihoods calculated by the likelihood calculation unit, wherein the block division unit divides the reception signal of the at least one of the reception antennas into the multiple blocks based on the multipath by using the reception replica signals generated by the reception replica signal generation unit.

(4) In the reception device according to the aspect of the present invention, the interference cancellation unit may generate and removes interference replicas from the bit likelihoods.

(5) In the reception device according to the aspect of the present invention, the transmission signal may be spread and code-multiplexed, and the transmission signal detection unit may include: a despreading unit which despreads signals produced by the signal separation unit; and a demodulation unit which calculates bit likelihoods from the despread signals.

(6) In the reception device according to the aspect of the present invention, the interference cancellation unit may generate and remove at least one of the multiple transmission signals transmitted by the transmission device as an interference replica.

(7) In the reception device according to the aspect of the present invention, the interference cancellation unit may generate and remove at least one of code-multiplexed signals as an interference replica.

(8) In the reception device according to the aspect of the present invention, the interference cancellation unit may generate and remove at least one of the multiple transmission signals transmitted by the transmission device and at least one of code-multiplexed signals as an interference replica.

(9) According to still another aspect of the present invention, there is provided a communication method for use in a reception method using a reception device which receives multiple transmission signals transmitted from a transmission device including multiple transmission antennas by at least one reception antenna, the communication method including: estimating propagation channel responses among the multiple transmission antennas and the reception antenna; dividing a reception signal of at least one of the reception antennas into multiple blocks; and detecting the transmission signals transmitted by the transmission device based on the reception signal divided in the division and the propagation channel responses estimated in the estimation, wherein the detection includes: generating and removing an interference replica; and separating a signal into which a transmission signal is multiplexed from an output of the generation and removal.

(10) In the communication method according to the aspect of the present invention, the division and the detection may be iterated.

Effect of the Invention

The communication system, the reception device, and the communication method of the present invention can obtain good transmission characteristics between the transmission device and the reception device without increasing the number of reception antennas of the reception device.

BEST MODE FOR CARRYING OUT THE INVENTION (First Embodiment)

First, a communication system according to the first embodiment of the present invention will be described. The communication system includes a radio transmission device 100 (FIG. 1) and a radio reception device 200 (FIG. 2). In the first embodiment, the case where MIMO-orthogonal frequency division multiplexing (OFDM) is used will be described.

Figure 1:
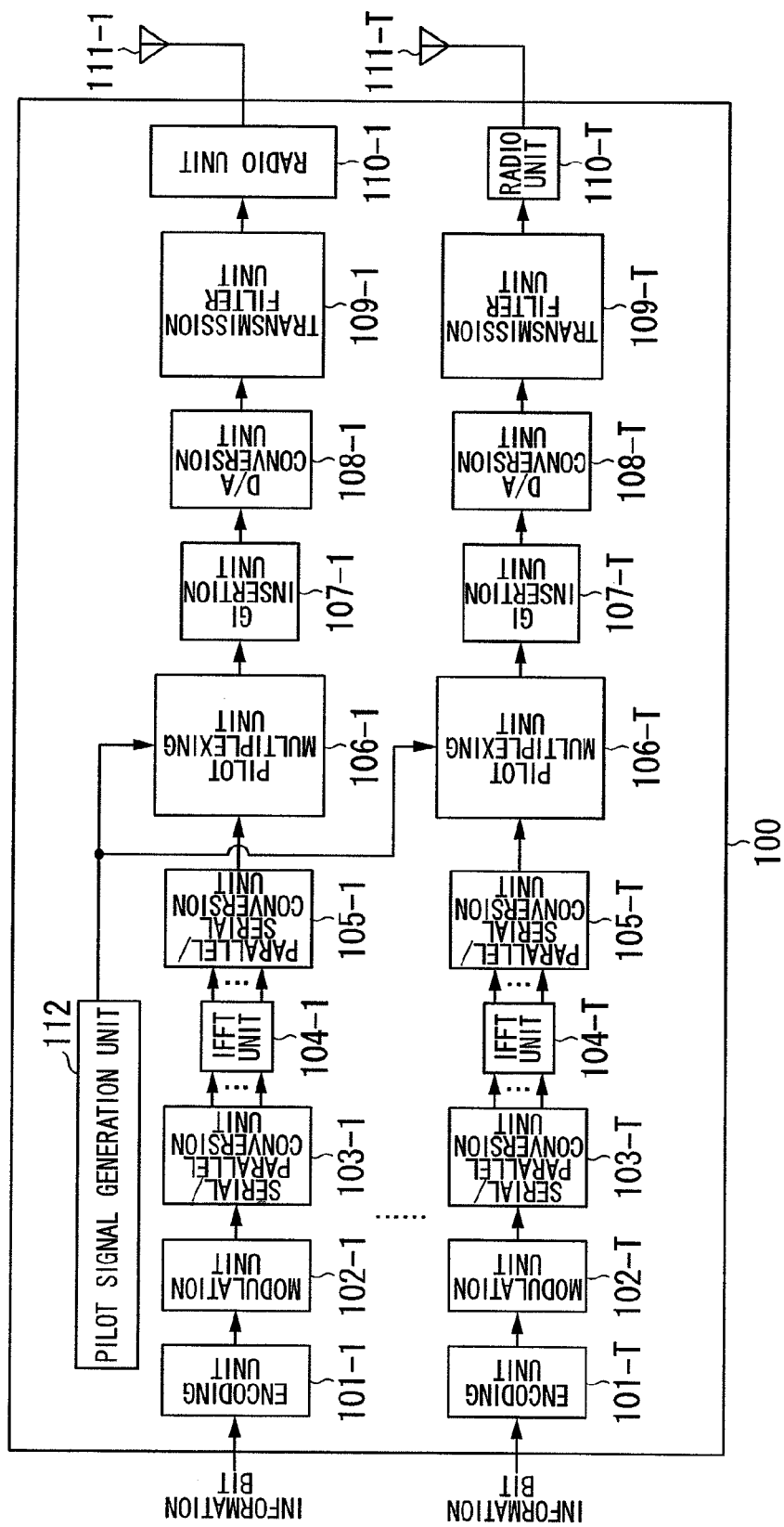
FIG. 1 is a schematic block diagram showing the configuration of a radio transmission device 100 according to a first embodiment of the present invention.
Figure 2:
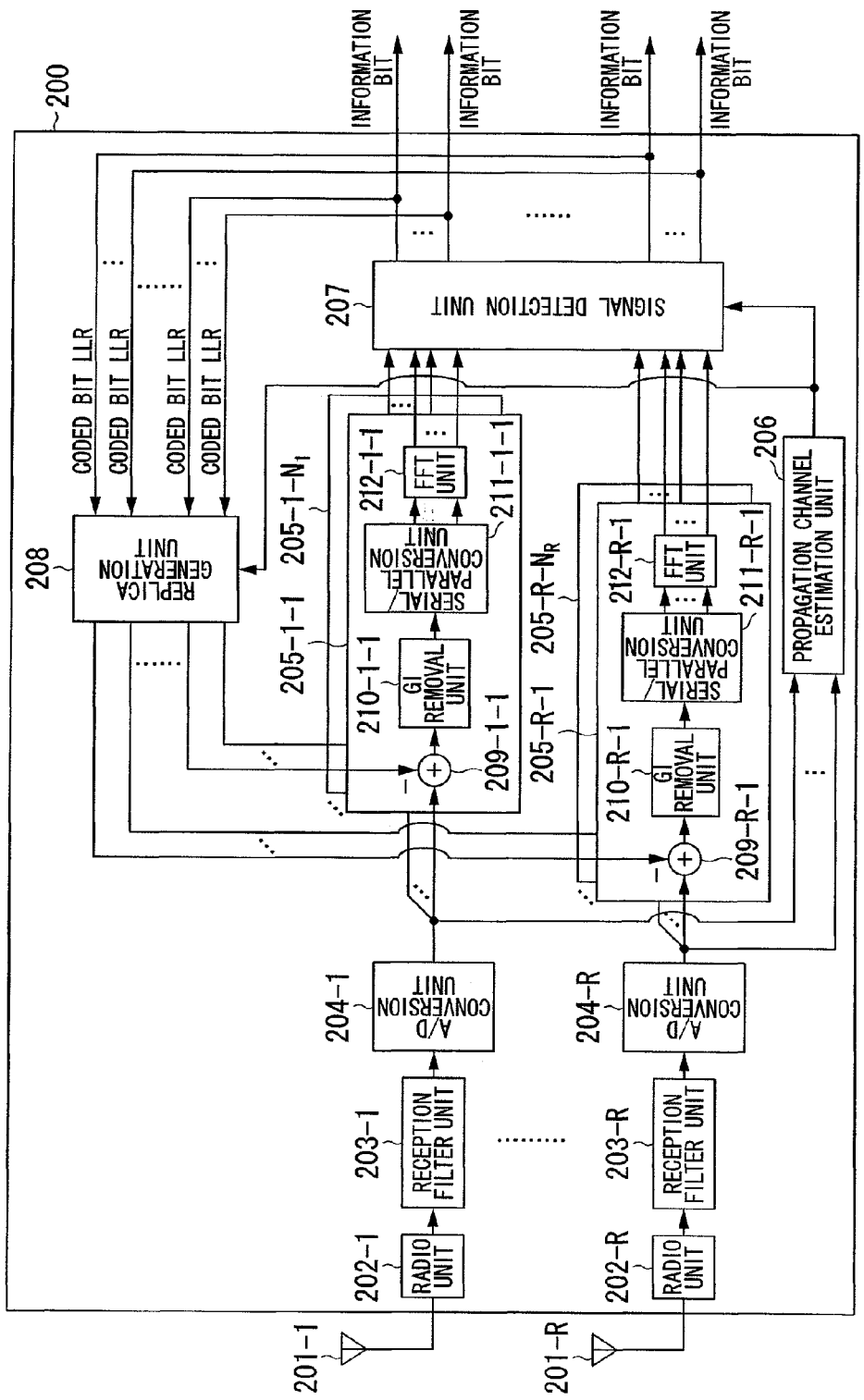
FIG. 2 is a schematic block diagram showing the configuration of a radio reception device 200 according to the first embodiment of the present invention.

FIG. 1 is a schematic block diagram showing the configuration of the radio transmission device 100 according to the first embodiment of the present invention. The radio transmission device 100 includes encoding units 101-1 to 101-T (T is an integer greater than or equal to 2), modulation units 102-1 to 102-T, serial/parallel conversion units 103-1 to 103-T, IFFT (inverse fast Fourier transform) units 104-1 to 104-T, parallel/serial conversion units 105-1 to 105-T, pilot multiplexing units 106-1 to 106-T, GI (guard interval) insertion units 107-1 to 107-T, D/A (digital to analogue) conversion units 108-1 to 108-T, transmission filter units 109-1 to 109-T, radio units 110-1 to 110-T, transmission antennas 111-1 to 111-T, and a pilot signal generation unit 112.

An information bit output from an upper layer of the radio transmission device 100 is input to the encoding unit 101-1. The encoding unit 101-1 performs error correction coding of a convolution code, a turbo code, or the like for the input information bit, and outputs the coded bit to the modulation unit 102-1.

The modulation unit 102-1 maps a signal output by the encoding unit 101-1 to a modulation symbol of quadrature phase shift keying (QPSK), 16 quadrature amplitude modulation (16QAM), or the like, and outputs the mapped signal to the serial/parallel conversion unit 103-1.

The serial/parallel conversion unit 103-1 performs a serial-to-parallel conversion process for the signal output by the modulation unit 102-1, and outputs parallel signals to the IFFT unit 104-1.

The IFFT unit 104-1 performs a time-to-frequency conversion process for the signals output by the serial/parallel conversion unit 103-1, and outputs the frequency signals to the parallel/serial conversion unit 105-1.

The parallel/serial conversion unit 105-1 performs a parallel-to-serial conversion process for the signals output by the IFFT unit 104-1, and outputs a serial signal to the pilot multiplexing unit 106-1.

The pilot multiplexing unit 106-1 multiplexes a pilot signal generated by the pilot signal generation unit 112 into a signal output by the parallel/serial conversion unit 105-1, and outputs the signal to the GI insertion unit 107-1.

The GI insertion unit 107-1 adds a GI to the signal output by the pilot multiplexing unit 106-1, and outputs the signal to the D/A conversion unit 108-1.

The D/A conversion unit 108-1 converts the signal output by the GI insertion unit 107-1 from a digital signal into an analog signal, and outputs the analog signal to the transmission filter unit 109-1.

The transmission filter unit 109-1 shapes a waveform of the signal output by the D/A conversion unit 108-1, and outputs the waveform-shaped signal to the radio unit 110-1.

The radio unit 110-1 converts the signal output by the transmission filter unit 109-1 into a radio frequency, and outputs the radio frequency signal to the transmission antenna 111-1. The transmission antenna 111-1 transmits the signal output by the radio unit 110-1 to the radio reception device 200 (FIG. 2).

Multiple (T) transmission signals generated as described above are generated in parallel and transmitted to the radio reception device 200 at the same frequency and the same timing using the multiple transmission antennas 111-1 to 111-T. The transmission signals are received by the radio reception device 200 through multipath propagation channels.

Since the configurations of the encoding units 101-2 (not shown) to 101-T, the modulation units 102-2 (not shown) to 102-T, the serial/parallel conversion units 103-2 (not shown) to 103-T, the IFFT units 104-2 (not shown) to 104-T, the parallel/serial conversion units 105-2 (not shown) to 105-T, the pilot multiplexing units 106-2 (not shown) to 106-T, the GI insertion units 107-2 (not shown) to 107-T, the D/A conversion units 108-2 (not shown) to 108-T, the transmission filter units 109-2 (not shown) to 109-T, the radio units 110-2 (not shown) to 110-T, and the transmission antennas 111-2 (not shown) to 111-T are the same as those of the encoding unit 101-1, the modulation unit 102-1, the serial/parallel conversion unit 103-1, the IFFT unit 104-1, the parallel/serial conversion unit 105-1, the pilot multiplexing unit 106-1, the GI insertion unit 107-1, the D/A conversion unit 108-1, the transmission filter unit 109-1, the radio unit 110-1, and the transmission antennas 111-1, description thereof is omitted.

FIG. 2 is a schematic block diagram showing the configuration of the radio reception device 200 according to the first embodiment of the present invention. The radio reception device 200 includes reception antennas 201-1 to 201-R (R is an integer greater than or equal to 1), radio units 202-1 to 202-R, reception filter units 203-1 to 203-R, A/D conversion units 204-1 to 204-R, block division units 205-1-1 to 205-1-$N_1$ ($N_1$ is an integer greater than or equal to 2), . . . , and 205-R-1 to 205-R-$N_R$ ($N_R$ is an integer greater than or equal to 2), a signal detection unit 207, a replica generation unit 208, and a propagation channel estimation unit 206.

The block division unit 205-1-1 includes an adder 209-1-1, a GI removal unit 210-1-1, a serial/parallel conversion unit 211-1-1, and a fast Fourier transform (FFT) unit 212-1-1. The block division unit 205-1-1 divides a reception signal of the reception antennas 201-1 to 201-R into multiple blocks using a reception replica signal generated by the replica generation unit 208.

The block division units 205-1-1 to 205-1-$N_1$, . . . , and 205-R-1 to 205-R-$N_R$ may divide the reception signals of the reception antennas 201-1 to 201-R into multiple blocks whose number is greater than the number of multiple transmission antennas 111-1 to 111-T of the radio transmission device 100.

Since the block division units 205-1-2 (not shown) to 205-1-$N_1$, . . . , and 205-R-1 to 205-R-$N_R$ have the same configurations as the block division unit 205-1-1, description thereof is omitted.

The reception antenna 201-1 receives a signal transmitted by the radio transmission device 100, and outputs the signal to the radio unit 202-1. The radio unit 202-1 converts the signal output by the reception antenna 201-1 from a radio frequency into a baseband signal, and outputs the baseband signal to the reception filter unit 203-1. The reception filter unit 203-1 shapes a waveform of the signal output by the radio unit 202-1, and outputs the waveform-shaped signal to the A/D conversion unit 204-1.

The A/D conversion unit 204-1 converts the signal output by the reception filter unit 203-1 from an analog signal into a digital signal, and outputs the digital signal to the block division units 205-1-1 to 205-1-$N_1$ and the propagation channel estimation unit 206.

The block division units 205-1-1 to 205-1-$N_1$ divide the signal output by the A/D conversion unit 204-1 based on an arrival time of a delay wave, power, or the number of paths. The delay wave includes a first incoming wave from the radio transmission device 100 to the radio reception device 200.

The adder 209-1-1 of the block division unit 205-1-1 subtracts a replica of a delay wave component generated by the replica generation unit 208 from the signal output by the A/D conversion unit 204-1, and outputs a subtraction result to the GI removal unit 210-1-1.

The GI removal unit 210-1-1 removes a GI from a signal output by the adder 209-1-1, and outputs the signal to the serial/parallel conversion unit 211-1-1. The serial/parallel conversion unit 211-1-1 performs a serial-to-parallel conversion process for the signal output by the GI removal unit 210-1-1, and outputs parallel signals to the FFT unit 212-1-1. The FFT unit 212-1-1 converts the signals output by the serial/parallel conversion unit 211-1-1 from time domain signals into frequency domain signals, and outputs the frequency domain signals to the signal detection unit 207.

The signal detection unit 207 calculates likelihoods of reception signals received by the reception antennas 201-1 to 201-R, and outputs the calculated likelihoods to the replica generation unit 208. Also, the signal detection unit 207 detects transmission signals transmitted by the radio transmission unit 100 based on reception signals divided by the block division units 205-1-1 to 205-1-$N_1$, . . . , and 205-R-1 to 205-R-$N_R$ into multiple blocks and propagation channel responses estimated by the propagation channel estimation unit 206. The propagation channel estimation unit 206 estimates the propagation channel responses by using a recursive least square (RLS) algorithm or the like for pilot signals.

The replica generation unit 208 generates reception replica signals based on the propagation channel responses estimated by the propagation channel estimation unit 206 and the likelihoods calculated by the signal detection unit 207, and outputs the reception replica signals to the block division units 205-1-1 to 205-1-$N_1$.

The propagation channel estimation unit 206 estimates propagation channel responses among the multiple transmission antennas 111-1 to 111-T of the radio transmission device 100 and the reception antennas 201-1 to 201-R of the radio reception device 200. The propagation channel estimation unit 206 outputs the estimated propagation channel responses to the signal detection unit 207 and the replica generation unit 208.

Figure 3:
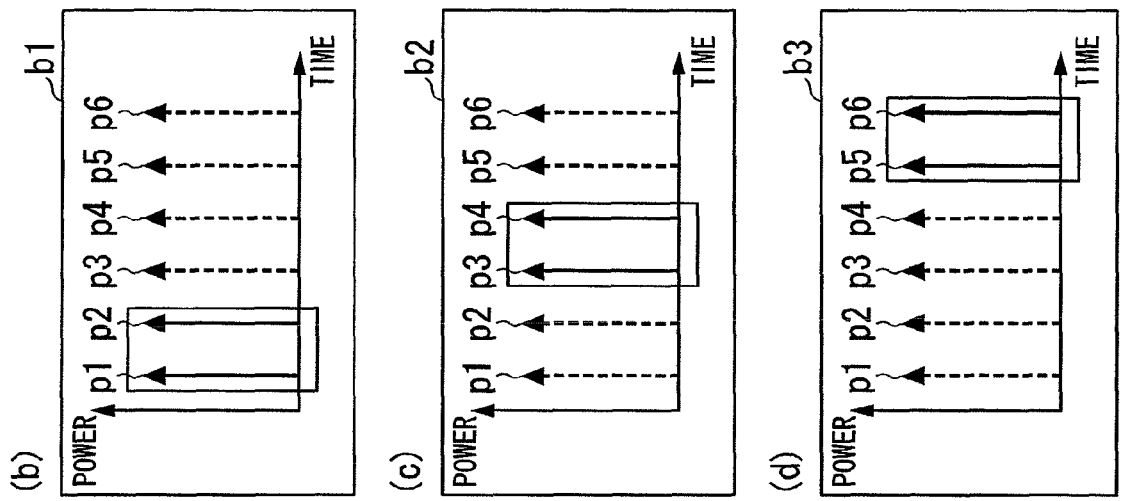
FIG. 3 is a diagram illustrating a process of subtracting a replica of a delay wave component in block division units 205-1-1 to 205-R-$N_R$ of the radio reception device 200 according to the first embodiment of the present invention.
Figure 3:
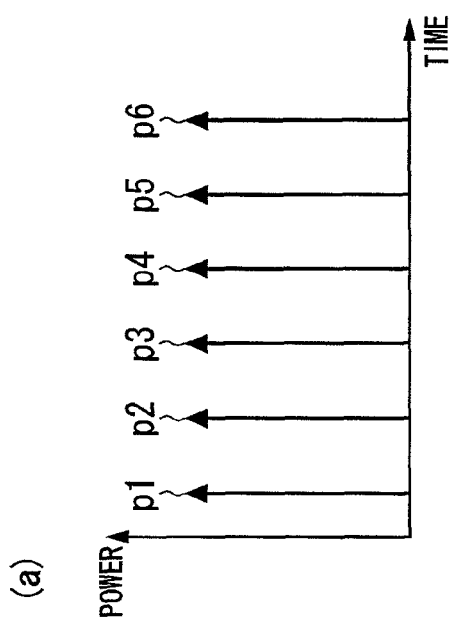

FIG. 3 is a diagram illustrating a process of subtracting a replica of a delay wave component in the block division units 205-1-1 to 205-R-$N_R$ of the radio reception device 200 according to the first embodiment of the present invention.

FIGS. 3(*a*) to (*d*) show delay profiles with the time shown on the horizontal axis and the power shown on the vertical axis.

p1, p2, p3, p4, p5, and p6 indicate propagation channel responses of respective paths in multipath propagation channels. Here, the case where delay waves are divided into a block b1 (FIG. 3(*b*)), a block b2 (FIG. 3(*c*)), and a block b3 (FIG. 3(*d*)) will be described. Here, the paths p1 to p6 are divided into three at an equivalent interval in a time-axis direction. Two paths are included in each of the blocks b1 to b3.

If the paths p1 to p6 are divided, the replica generation unit 208 (FIG. 2) generates path p3, p4, p5, and p6 components when the block b1 is generated. The replica generation unit 208 generates path p1, p2, p5, and p6 components when the block b2 is generated. The replica generation unit 208 generates path p1, p2, p3, and p4 components when the block b3 is generated. The paths generated by the replica generation unit 208 are subtracted from respective reception signals.

By dividing the multiple paths p1 to p6 into the blocks b1 to b3, outputs of the block division units 205-1-1 to 205-R-$N_R$ become independent signals and a state in which the number of reception signals is virtually increased is reached.

Figure 4:
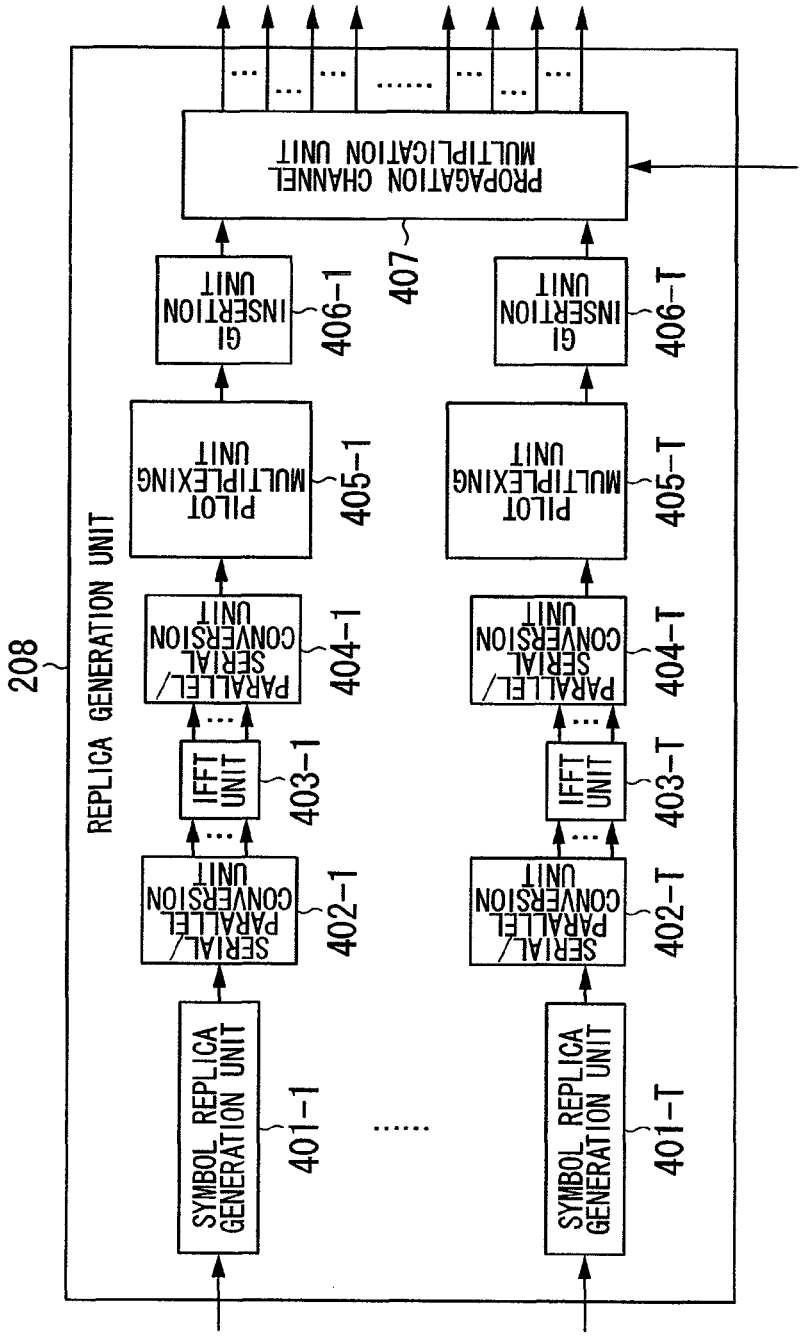
FIG. 4 is a schematic block diagram showing the configuration of a replica generation unit 208 of the radio reception device 200 (FIG. 2) according to the first embodiment of the present invention.

FIG. 4 is a schematic block diagram showing the configuration of the replica generation unit 208 of the radio reception device 200 (FIG. 2) according to the first embodiment of the present invention. The replica generation unit 208 includes symbol replica generation units 401-1 to 401-R, serial/parallel conversion units 402-1 to 402-R, IFFT units 403-1 to 403-R, parallel/serial conversion units 404-1 to 404-R, pilot multiplexing units 405-1 to 405-R, GI insertion units 406-1 to 406-R, and a propagation channel multiplication unit 407.

The symbol replica generation unit 401-1 converts a bit log likelihood ratio (LLR) output from the signal detection unit 207 (FIG. 2) into a modulation symbol replica, and outputs the modulation symbol replica to the adders 209-1-1 to 209-1-$N_1$ (not shown) of the block division units 205-1-1 to 205-1-$N_1$ (not shown), . . . , and 205-R-1 to 205-R-$N_R$ (not shown). Here, the case of using QPSK modulation as a method of generating a symbol replica from a bit LLR will be described.

When bit LLRs constituting a QPSK modulation symbol are $\lambda(b_0)$ and $\lambda(b_1)$, a symbol replica Z of QPSK modulation can be expressed by the following Equation (6).

$$Z = \frac{1}{\sqrt{2}} \tanh(\lambda(b_0)/2) + \frac{j}{\sqrt{2}} \tanh(\lambda(b_1)/2) \tag{6}$$

In this regard, j is an imaginary unit in Equation (6).

The serial/parallel conversion unit 402-1 performs a serial-to-parallel conversion process for a signal output by the symbol replica generation unit 401-1, and outputs parallel signals to the IFFT unit 403-1. The IFFT unit 403-1 converts the signals output by the serial/parallel conversion unit 402-1 from frequency domain signals into time domain signals, and outputs the time domain signals to the parallel/serial conversion unit 404-1.

The parallel/serial conversion unit 404-1 performs a parallel-to-serial conversion process for the signals output by the IFFT unit 403-1, and outputs a serial signal to the pilot multiplexing unit 405-1. The pilot multiplexing unit 405-1 multiplexes a pilot signal into the signal output by the parallel/serial conversion unit 404-1, and outputs the signal to the GI insertion unit 406-1. The GI insertion unit 406-1 inserts a GI into the signal output by the pilot multiplexing unit 405-1, and outputs the signal to the propagation channel multiplication unit 407.

These processes are performed in parallel by the serial/parallel conversion units 402-1 to 402-R, the IFFT units 403-1 to 403-R, the parallel/serial conversion units 404-1 to 404-R, the pilot multiplexing units 405-1 to 405-R, and the GI insertion units 406-1 to 406-R.

The propagation channel multiplication unit 407 convolutes propagation channel responses estimated by the propagation channel estimation unit 206 (FIG. 2) into propagation channels divided into blocks with respect to signals output by the GI insertion units 406-1 to 406-R. Thereby, the propagation channel multiplication unit 407 generates replica signals for block division.

The replica generation unit 208 outputs the replica signals for block division to the respective adders 209-1-1 to 209-R-$N_R$ of the block division units 205-1-1 to 205-1-$N_1$, ..., and 205-R-1 to 205-R-$N_R$.

Here, it is assumed that the propagation channel responses estimated by the propagation channel estimation unit 207 are h. Also, it is assumed that the outputs of the GI insertion units 406-1 to 406-T are s. Processing of the propagation channel multiplication unit 407 in the case of division into three blocks b1, b2, and b3 will be described.

Here, the case where the number of transmission antennas, T, and the number of reception antennas, R, are both 2 will be described. It is assumed that a replica signal for extracting the block b1 is $r^1$. Also, it is assumed that a propagation channel response of a delay wave component is a vector $h^1$. At this time, the vector $h^1$ can be expressed by Equation (7) since a (2 rows×2 columns) MIMO system is used.

$$h^1 = \begin{pmatrix} h^1_{11} & h^1_{12} \\ h^1_{21} & h^1_{22} \end{pmatrix} \quad (7)$$

In this regard, respective elements of the vector $h^1$ are propagation channel responses among the respective transmission antennas and the respective reception antennas. The vector $r^1$ as the replica signal for extracting the block b1 is the same as the following Equation (8).

$$r^1 = \begin{pmatrix} r^1_1 \\ r^1_2 \end{pmatrix} = \begin{pmatrix} h^1_{11} \otimes s_1 + h^1_{12} \otimes s_2 \\ h^1_{21} \otimes s_1 + h^1_{22} \otimes s_2 \end{pmatrix} \quad (8)$$

In this regard, $\otimes$ indicates a convolution operation.

In Equation (8), $r^1_1$ and $r^1_2$ respectively indicate a component of the first reception antenna and a component of the second reception antenna in the vector $r^1$. Also, $s_1$ and $s_2$ indicate a signal component transmitted by the first transmission antenna and a signal component transmitted by the second transmission antenna.

Likewise, even in the block b2, it is assumed that a replica signal for extracting the block b2 is a vector $r^2$ and a propagation channel response of a delay wave component is a vector $h^2$. Likewise, even in the block b3, it is assumed that a replica signal for extracting the block b3 is a vector $r^3$ and a propagation channel response of a delay wave component is a vector $h^3$. In this case, outputs of the propagation channel multiplication unit 407 are expressed by the following Equations (9) and (10).

$$r^2 = \begin{pmatrix} r^2_1 \\ r^2_2 \end{pmatrix} = \begin{pmatrix} h^2_{11} \otimes s_1 + h^2_{12} \otimes s_2 \\ h^2_{21} \otimes s_1 + h^2_{22} \otimes s_2 \end{pmatrix} \quad (9)$$

$$r^3 = \begin{pmatrix} r^3_1 \\ r^3_2 \end{pmatrix} = \begin{pmatrix} h^3_{11} \otimes s_1 + h^3_{12} \otimes s_2 \\ h^3_{21} \otimes s_1 + h^3_{22} \otimes s_2 \end{pmatrix} \quad (10)$$

$r^1$, $r^2$, and $r^3$ output by the replica generation unit 208 are input to the block division units 205-1-1 to 205-1-$N_1$, ..., and 205-R-1 to 205-R-$N_R$. The blocks are divided by the adders 209-1-1 to 209-1-$N_1$, ..., and 209-R-1 to 209-R-$N_R$ subtracting $r^1$, $r^2$, and $r^3$ from the reception signals. For example, if $r^1$ is subtracted from the reception signal, the block b1 is extracted.

Figure 5:
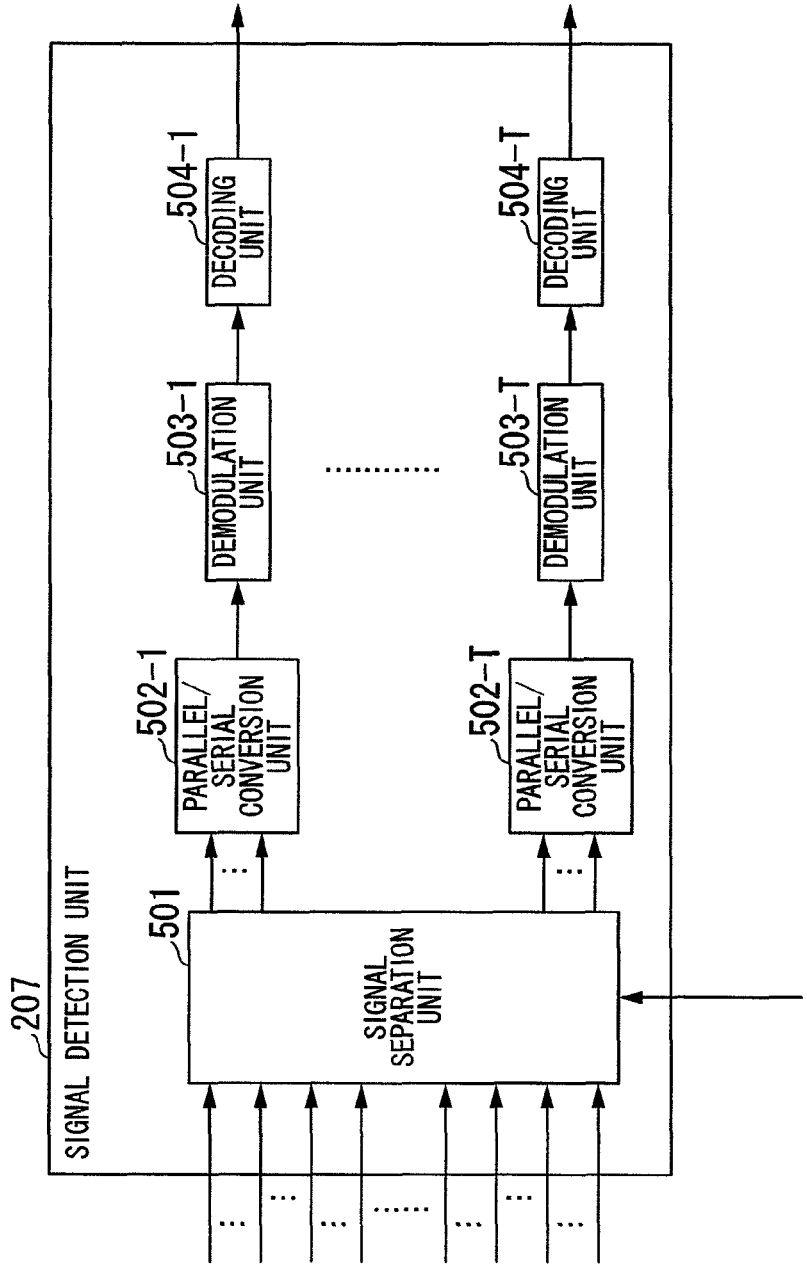
FIG. 5 is a schematic block diagram showing the configuration of a signal detection unit 207 (FIG. 2) of the radio reception device 200 according to the first embodiment of the present invention.

FIG. 5 is a schematic block diagram showing the configuration of the signal detection unit 207 (FIG. 2) of the radio reception device 200 according to the first embodiment of the present invention. The signal detection unit 207 includes a signal separation unit 501, parallel/serial conversion units 502-1 to 502-T, demodulation units 503-1 to 503-T, and decoding units 504-1 to 504-T.

The signal separation unit 501 estimates signals transmitted by the respective transmission antennas 111-1 to 111-T of the radio transmission device 100 from signals output by the block division units 205-1-1 to 205-1-$N_1$, ..., and 205-R-1 to 205-R-$N_R$.

Next, processing of the signal separation unit 501 will be described. It is assumed that the number of transmission antennas is T and the number of reception antennas is R. The number of block divisions may be arbitrarily set for each reception antenna. Here, the number of block divisions in a $p^{th}$ reception antenna is described as $N_p$ ($1 \leq p \leq R$).

A T×R MIMO system is provided before block division. However, since the number of reception signals is virtually increased by block division, a T×($RN_B$) MIMO system is provided after block division. In this regard, the relationship of the following Equation (11) is established.

$$N_B = \sum_{i=1}^{R} N_i \quad (11)$$

The signal separation unit 501 estimates T transmission signals from $RN_B$ reception signals by respective subcarriers. At this time, a reception signal of a $k^{th}$ subcarrier may be expressed as shown in the following Equations (12) to (16).

$$R(k) = H(k)S(k) + N(k) \quad (12)$$

$$R(k) = [R_1(k) \; ... \; R_{RN_B}(k)]^T \quad (13)$$

$$H(k) = \begin{pmatrix} H_{11}(k) & \cdots & H_{1T}(k) \\ \vdots & \ddots & \vdots \\ H_{(RN_B)1}(k) & \cdots & H_{(RN_B)T}(k) \end{pmatrix} \quad (14)$$

$$S(k) = [S_1(k) \; ... \; S_T(k)]^T \quad (15)$$

$$N(k) = [N_1(k) \; ... \; N_{RN_B}(k)]^T \quad (16)$$

In this regard, a vector R(k) of the left side of Equation (12) and the left side of Equation (13) is an ($RN_B$ rows×1 column) vector having, in elements, outputs of the block division units 205-1-1 to 205-R-$N_R$ of the radio reception device 200.

Also, a vector H(k) of the left side of Equation (14) is an ($RN_B$ rows×T columns) matrix having, in elements, frequency responses of paths extracted by the respective blocks.

A vector S(k) of the left side of Equation (15) is a (T rows×1 column) vector having, in elements, modulation symbols of a transmitter.

A vector N(k) of the left side of Equation (16) is an (RN$_B$ rows×1 column) vector having, in elements, noise of outputs of the block division units 205-1-1 to 205-1-N$_{1B}$, . . . , and 205-R-1 to 205-R-N$_B$.

The vector H(k) will be described using an example of h$^1$, h$^2$, and h$^3$ described above. It is assumed that propagation channel responses obtained by extracting delay wave components other than delay waves included in h$^1$, h$^2$, and h$^3$ from h are h$^{~1}$, h$^{~2}$, and h$^{~3}$. h$^{~1}$, h$^{~2}$, and h$^{~3}$ may be regarded as the propagation channel responses after block division.

It is assumed that frequency signals into which h$^{~1}$, h$^{~2}$, and h$^{~3}$ are converted are a vector H$^1$(k), a vector H$^2$(k), and a vector H$^3$(k), respectively. In this case, the vectors H$^1$(k), H$^2$(k), and H$^3$(k) may be expressed by the following Equations (17), (18), and (19), respectively.

$$H^1(k) = \begin{pmatrix} H^1_{11}(k) & H^1_{12}(k) \\ H^1_{21}(k) & H^1_{22}(k) \end{pmatrix} \quad (17)$$

$$H^2(k) = \begin{pmatrix} H^2_{11}(k) & H^2_{12}(k) \\ H^2_{21}(k) & H^2_{22}(k) \end{pmatrix} \quad (18)$$

$$H^3(k) = \begin{pmatrix} H^3_{11}(k) & H^3_{12}(k) \\ H^3_{21}(k) & H^3_{22}(k) \end{pmatrix} \quad (19)$$

At this time, the vector H(k) may be expressed by the following Equation (20).

$$H(k) = \begin{pmatrix} H^1_{11}(k) & H^1_{12}(k) \\ H^1_{21}(k) & H^1_{22}(k) \\ H^2_{11}(k) & H^2_{12}(k) \\ H^2_{21}(k) & H^2_{22}(k) \\ H^3_{11}(k) & H^3_{12}(k) \\ H^3_{21}(k) & H^3_{22}(k) \end{pmatrix} \quad (20)$$

Accordingly, the original is a 2×2 MIMO system, but it is possible to use a 2×6 MIMO system by dividing a reception signal into 3 blocks by each reception antenna.

For example, if a 3×2 MIMO system is divided into two blocks, a 3×4 MIMO system may be used.

To detect a vector S(k) from a vector R(k), a weight coefficient of a zero forcing (ZF) or a minimum mean square error (MMSE) criterion is used.

For example, a weight vector M$_{ZF}$(k) of the ZF criterion becomes the following Equation (21) or (22).

For example, a weight vector M$_{MMSE}$(k) of the MMSE criterion becomes the following Equation (23) or (24).

$$M_{ZF}(k) = H^H(k)(H(k)H^H(k))^{-1} \quad (21)$$

$$M_{ZF}(k) = (H^H(k)H(k))^{-1} H^H(k) \quad (22)$$

$$M_{MMSE}(k) = H^H(k)(H(k)H^H(k) + \sigma^2 I_{N_R})^{-1} \quad (23)$$

$$M_{MMSE}(k) = (H^H(k)H(k) + \sigma^2 I_{N_T})^{-1} H^H(k) \quad (24)$$

In this regard, the superscript H in Equations (21), (22), (23), and (24) is the complex conjugate transpose of a matrix. Also, the superscript −1 is an inverse matrix. $\sigma^2$ is noise power. A vector I$_N$ is a (N rows×N columns) unit matrix.

A vector S(k) is detected by multiplying a vector M$_{ZF}$(k) or M$_{MMSE}$(k) from the left of the vector R(k). Here, linear processing of the ZF criterion or the MMSE criterion has been described, but non-linear processing as in a maximum likelihood (ML) criterion may be used.

However, since an output accuracy of the replica generation unit 208 is not complete, an error occurring upon block division may be used and noise and an error may be used in $\sigma^2$ of Equations (23) and (24).

Also, an error of the vector H(k) may be used in Equations (21), (22), (23), and (24).

It is assumed that a propagation channel response h$^{~1}$ of the block b1 after the above-described block division is h excluding a delay wave component of h$^1$, but the present invention is not limited thereto. For example, h$^{~1}$ may include the delay wave component of h$^1$ in response to the accuracy of a modulation symbol replica generated based on a coded bit LLR or a bit LLR.

At this time, there is a high possibility that a complete replica is generated if an absolute value of a bit LLR is large. Thus, an error of block division is absent and a component of h$^1$ is rarely included in h$^{~1}$. However, as an absolute value of the bit LLR gradually decreases, an error of block division increases. Thus, if a component of h$^1$ included in h$^{~1}$ increases and the absolute value of the bit LLR becomes 0, h$^1$ is directly included in h$^{~1}$.

This is the same in the blocks b2 and b3. Consequently, an error of block division is reflected in the vector H(k). If weights M$_{ZF}$(k) or M$_{MMSE}$(k) as in Equations (21), (22), (23), and (24) is calculated based on the vector H(k) in which the effect of error is reflected, it is possible to calculate a weight reflecting the error of block division.

In FIG. 5, the parallel/serial conversion unit 502-1 performs a parallel-to-serial conversion process for signals output by the signal separation unit 501, and outputs a serial signal to the demodulation unit 503-1. The demodulation unit 503-1 converts the signal output by the parallel/serial conversion unit 502-1 into a bit LLR, and outputs the bit LLR to the decoding unit 504-1.

Here, a method of calculating a coded bit LLR from a symbol at the radio reception device 200 will be described as an example of QPSK modulation.

A QPSK symbol transmitted at the radio transmission device 100 is described as X and a symbol after despreading at the radio reception device 200 is described as X$_e$. When bits constituting X are b$_0$ and b$_1$ (b$_0$, b$_1$=±1), X may be expressed by the following Equation (25).

$$X = \frac{1}{\sqrt{2}}(b_0 + jb_1) \quad (25)$$

$\lambda(b_0)$ and $\lambda(b_1)$ are calculated as LLRs of the bits b$_0$ and b$_1$ from an estimation value X$_e$ at the radio reception device 200 of X as in the following Equation (26).

$$\lambda(b_0) = \frac{2\text{Re}(X_c)}{\sqrt{2}(1-\mu)} \quad (26)$$

In this regard, Re( ) indicates a real part of a complex number in Equation (26). μ is an equivalent amplitude after propagation channel compensation. In an example of Equations (23) and (24), μ is a corresponding transmission antenna component among elements of $M_{MMSE}H(k)$. $\lambda(b_1)$ is calculated by replacing a real part and an imaginary part of $\lambda(b_0)$.

A coded bit LLR is input as an output of the demodulation unit 503-1 to the decoding unit 504-1. The decoding unit 504-1 performs a decoding process for a signal output by the demodulating unit 503-1, and outputs a coded bit LLR or information bit in which a likelihood is updated.

Since the configurations of the parallel/serial conversion units 502-2 (not shown) to 502-T, the demodulation units 503-2 (not shown) to 503-T, and the decoding units 504-2 (not shown) to 504-T are the same as those of the parallel/serial conversion unit 502-1, the demodulation unit 503-1, and the decoding unit 504-1, description thereof is omitted.

In the communication system according to the first embodiment of the present invention, the radio transmission device 100 (also referred to as a transmission device) includes multiple transmission antennas 111-1 to 111-T. The radio units 110-1 to 110-T (also referred to as transmission units) transmit transmission signals from the multiple transmission antennas 111-1 to 111-T to the radio reception device 200 (also referred to as a reception device).

The radio reception device 200 includes at least one reception antenna 201-1 to 201-R which receives transmission signals transmitted by the radio units 110-1 to 110-T of the radio transmission device 100. The signal detection unit 207 (also referred to as a likelihood calculation unit) calculates bit likelihoods from reception signals received by the reception antennas 201-1 to 201-R. The propagation channel estimation unit 206 (also referred to as a propagation channel response estimation unit) estimates propagation channel responses among the multiple transmission antennas 111-1 to 111-T of the radio transmission device 100 and the reception antennas 201-1 to 201-R of the radio reception device 200. The replica generation unit 208 (also referred to as a reception replica signal generation unit) generates reception replica signals based on the propagation channel responses estimated by the propagation channel estimation unit 206 and the bit likelihoods calculated by the signal detection unit 207. Using the reception replica signals generated by the replica generation unit 208, the block division units 205-1-1 to 205-1-$N_1$, ..., and 205-R-1 to 205-R-$N_R$ divide a reception signal of at least one of the reception antennas 201-1 to 201-R into multiple blocks. The signal detection unit 207 (also referred to as a transmission signal detection unit) detects the transmission signals transmitted by the radio transmission device 100 based on reception signals divided by the block division units 205-1-1 to 205-1-$N_1$, ..., and 205-R-1 to 205-R-$N_R$ into the multiple blocks and the propagation channel responses estimated by the propagation channel estimation unit 206.

According to the first embodiment of the present invention, it is possible to generate multiple independent reception signals without increasing the number of reception antennas of the radio reception device 200. If the number of antennas of the radio transmission device 100 is increased to increase a throughput, the number of reception signals may be virtually increased by dividing a multipath. Thus, good reception performance may be obtained without increasing the number of reception antennas of the radio reception device 200. Thus, high-speed transmission by MIMO or the like may be performed without depending upon the number of reception antennas even in a small-size radio reception device or the like.

(Second Embodiment)

Next, a communication system according to the second embodiment of the present invention will be described. This communication system includes a radio transmission device 100 and a radio reception device 600. In the second embodiment, the case of using a MIMO-parallel interference cancel (PIC) will be described.

Since the radio transmission device 100 according to the second embodiment is the same as the radio transmission device 100 described with reference to FIG. 1 of the first embodiment, description thereof is omitted.

Figure 6:
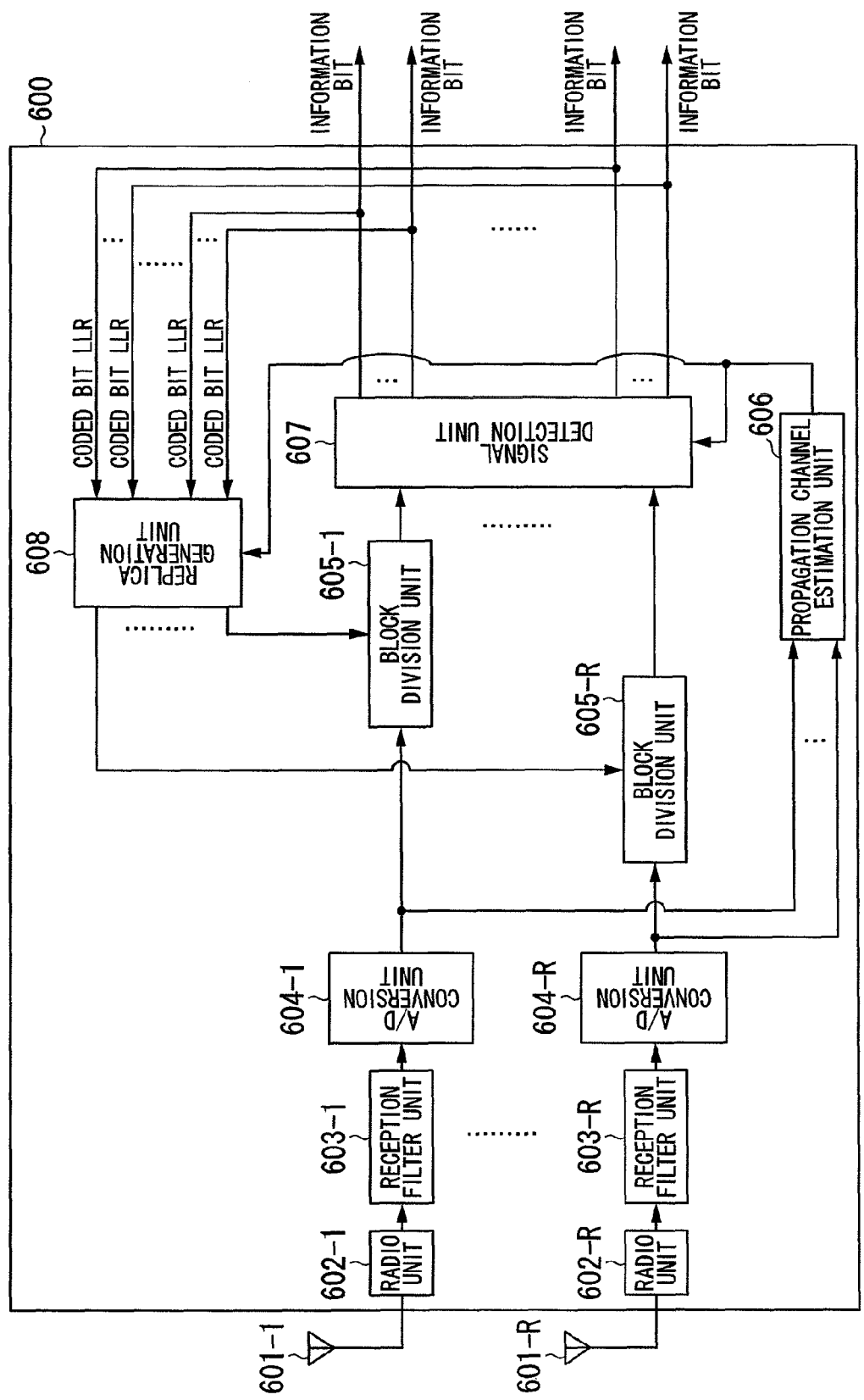
FIG. 6 is a schematic block diagram showing the configuration of a radio reception device 600 according to a second embodiment of the present invention.

FIG. 6 is a schematic block diagram showing the configuration of the radio reception device 600 according to the second embodiment of the present invention. The radio reception device 600 includes reception antennas 601-1 to 601-R, radio units 602-1 to 602-R, reception filter units 603-1 to 603-R, A/D conversion units 604-1 to 604-R, block division units 605-1 to 605-R, a propagation channel estimation unit 606, a signal detection unit 607, and a replica generation unit 608.

The reception antenna 601-1 receives a signal transmitted by the radio transmission device 100, and outputs the received signal to the radio unit 602-1. The radio unit 602-1 converts the signal output by the reception antenna 601-1 from a radio frequency into a baseband signal, and outputs the baseband signal to the reception filter unit 603-1.

The reception filter unit 603-1 shapes a waveform of the signal output by the radio unit 602-1 and outputs the waveform-shaped signal to the A/D conversion unit 604-1. The A/D conversion unit 604-1 converts the signal output by the reception filter unit 603-1 from an analog signal into a digital signal, and outputs the digital signal to the block division unit 605-1 and the propagation channel estimation unit 606.

The block division unit 605-1 performs a block division process and an interference cancellation process for the signal output by the A/D conversion unit 604-1 using a replica signal for block division generated by the replica generation unit 608 and an interference replica signal from another antenna of MIMO.

Since the configuration of the block division unit 605-1 is the same as the block division unit 205-1-1 (FIG. 2) described in the first embodiment, description thereof is omitted.

As a method of generating an interference replica from another antenna, a method of generating an interference replica simultaneously with a replica signal for block division or a method of generating an interference replica from another antenna after a block division process may be used.

When the interference replica is generated simultaneously with the replica signal for block division, an interference replica of a time domain (before an FFT process) is generated. In the case of generation after the block division process, an interference replica of a frequency domain (after the FFT process) is generated.

If the time domain interference replica is generated, replica signals from all antennas are generated from replica signals for block division. On the other hand, here, it is preferable to generate a replica signal from an antenna other than a desired antenna.

A signal obtained by subtracting the generated replica from a reception signal is applied to both the interference removal process from another antenna and the block division process.

Next, a method of removing interference by generating an interference replica in the frequency domain will be described.

Figure 7:
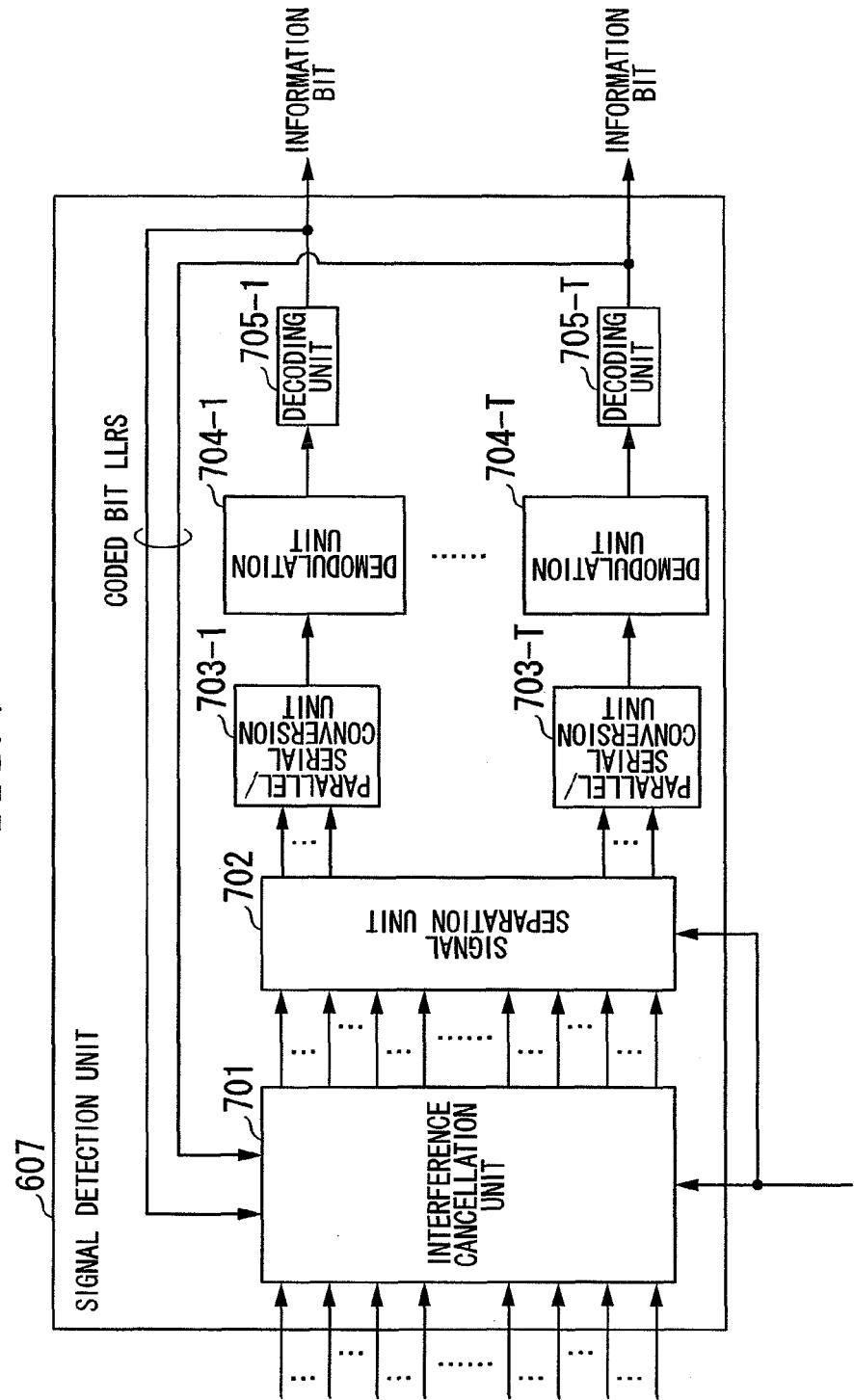
FIG. 7 is a schematic block diagram showing the configuration of a signal detection unit 607 according to the second embodiment of the present invention.

FIG. 7 is a schematic block diagram showing the configuration of the signal detection unit 607 according to the second embodiment of the present invention. The signal detection unit 607 includes an interference cancellation unit 701, a signal separation unit 702, parallel/serial conversion units 703-1 to 703-T, demodulation units 704-1 to 704-T, and decoding units 705-1 to 705-T.

The signal detection unit 207 (FIG. 5) according to the first embodiment performs processing by the signal separation unit 501 after the block division process. However, if an interference canceller is used, the signal separation unit 702 performs processing after the interference cancellation unit 701 removes interference.

Based on coded bit LLRs obtained by error correction decoding processes in the decoding units 705-1 to 705-T, the interference cancellation unit 701 generates interference replicas from other antennas and removes interference.

Here, the case where a signal of a $k^{th}$ subcarrier after block division is expressed by Equations (12) to (16) will be described. It is assumed that a $q^{th}$ transmission antenna is a desired antenna intended to receive a signal. In this case, interference replicas from other antennas are generated as replicas of transmitted signals other than that of the desired antenna as shown in Equations (27) and (28).

$$\tilde{R}_q(k)=H(k)\tilde{S}_q(k)+N(k) \quad (27)$$

$$\tilde{S}_q(k)=[\tilde{S}_1(k) \ldots \tilde{S}_{q-1}(k)\ 0\ \tilde{S}_{q+1}(k) \ldots \tilde{S}_T(k)]^T \quad (28)$$

$\tilde{S}_q(k)$ indicates a symbol replica in the $k^{th}$ subcarrier of the $q^{th}$ transmission antenna. Interference is removed as shown in the following Equation (29).

$$\hat{R}_q(k)=R(k)-\tilde{R}_q(k) \quad (29)$$

The interference cancellation unit 701 calculates and outputs $\hat{R}_q(k)$ for all q and k. For example, the signal separation unit 702 performs MIMO signal separation for each $\hat{R}_q(k)$ obtained from the interference cancellation unit 701 using an MMSE weight expressed by the following Equation (30).

$$M_{MMSE}(k)=H^H(k)(H(k)\Lambda(k)H(k)^H+\sigma^2 I_{N_R}) \quad (30)$$

$\Lambda(k)$ is expressed by the following Equation (31).

$$\Lambda(k)=\mathrm{diag}[1-|\tilde{S}_1(k)|^2 \ldots 1-|\tilde{S}_{q-1}(k)|^2\ 1\ 1-|\tilde{S}_{q+1}(k)|^2 \ldots 1-|\tilde{S}_T(k)|^2] \quad (31)$$

In this regard, diag( ) is a diagonal matrix having elements within the brackets in diagonal elements.

The parallel/serial conversion units 703-1 to 703-T (FIG. 7) perform parallel-to-serial conversion processes for signals output by the signal separation unit 702, and output serial signals to the demodulation units 704-1 to 704-T. The demodulation units 704-1 to 704-T demodulate the signals output by the parallel/serial conversion units 703-1 to 703-T, and output the demodulated signals to the decoding units 705-1 to 705-T. The decoding units 705-1 to 705-T perform error correction decoding processes for the signals output by the demodulation units 704-1 to 704-T. The decoding units 705-1 to 705-T output information bits to an outside, and output coded bit LLRs to the interference cancellation unit 701.

In a communication system according to the second embodiment of the present invention, the radio transmission device 100 (also referred to as a transmission device) includes multiple transmission antennas 111-1 to 111-T. The radio units 110-1 to 110-T (also referred to as transmission units) transmit transmission signals from the multiple transmission antennas 111-1 to 111-T to the radio reception device 600 (also referred to as a reception device).

The radio reception device 600 includes at least one reception antenna 601-1 to 601-R which receives transmission signals transmitted by the radio units 110-1 to 110-T of the radio transmission device 100. The signal detection unit 607 (also referred to as a likelihood calculation unit) calculates bit likelihoods from reception signals received by the reception antennas 601-1 to 601-R. The propagation channel estimation unit 606 (also referred to as a propagation channel response estimation unit) estimates propagation channel responses among the multiple transmission antennas 111-1 to 111-T of the radio transmission device 100 and the reception antennas 601-1 to 601-R of the radio reception device 600. The replica generation unit 608 (also referred to as a reception replica signal generation unit) generates reception replica signals based on the propagation channel responses estimated by the propagation channel estimation unit 606 and the bit likelihoods calculated by the signal detection unit 607. Using the reception replica signals generated by the replica generation unit 608, the block division units 605-1 to 605-R divide a reception signal of at least one of the reception antennas 601-1 to 601-R into multiple blocks using the reception replica signals generated by the replica generation unit 208. The signal detection unit 607 (also referred to as a transmission signal detection unit) detects the transmission signals transmitted by the radio transmission device 100 based on the reception signals divided by the block division units 605-1 to 605-R into the multiple blocks and the propagation channel responses estimated by the propagation channel estimation unit 606.

The signal detection unit 607 of this embodiment includes the interference canceller 701 and the signal separation unit 702. An interference replica is generated from a bit likelihood calculated by the signal detection unit 607 and is removed by the interference cancellation unit 701. The signal separation unit 702 separates a signal into which a transmission signal is multiplexed from an output of the interference cancellation unit 701.

In the second embodiment, a method of performing a process of dividing into blocks and a MIMO interference cancellation process is described. The MIMO interference cancellation is based on the use of a MIMO separation scheme of MMSE or the like. Thus, it is also possible to improve the performance of MIMO interference cancellation by improving the performance of MIMO separation by the block division process.

It is not necessary to simultaneously perform the block division process and the MIMO interference cancellation. For example, if the number of iterations is small, it is possible to perform only the block division process and to perform the MIMO interference cancellation and the block division process thereafter.

(Third Embodiment)

Next, a communication system according to the third embodiment of the present invention will be described. This communication system includes a radio transmission device 800 and a radio reception device 900. In the third embodiment, the case of using a MIMO-multi carrier-code division multiple access (MC-CDMA) will be described.

In MC-CDMA for spreading in a frequency domain, multi-code interference (MCI) occurs because of frequency selectivity fading. Since MCI degrades the performance of reception, the performance of a block division process is also degraded. In the third embodiment, the case of combining an MCI canceller which cancels MCI with the block division process will be described.

Figure 8:
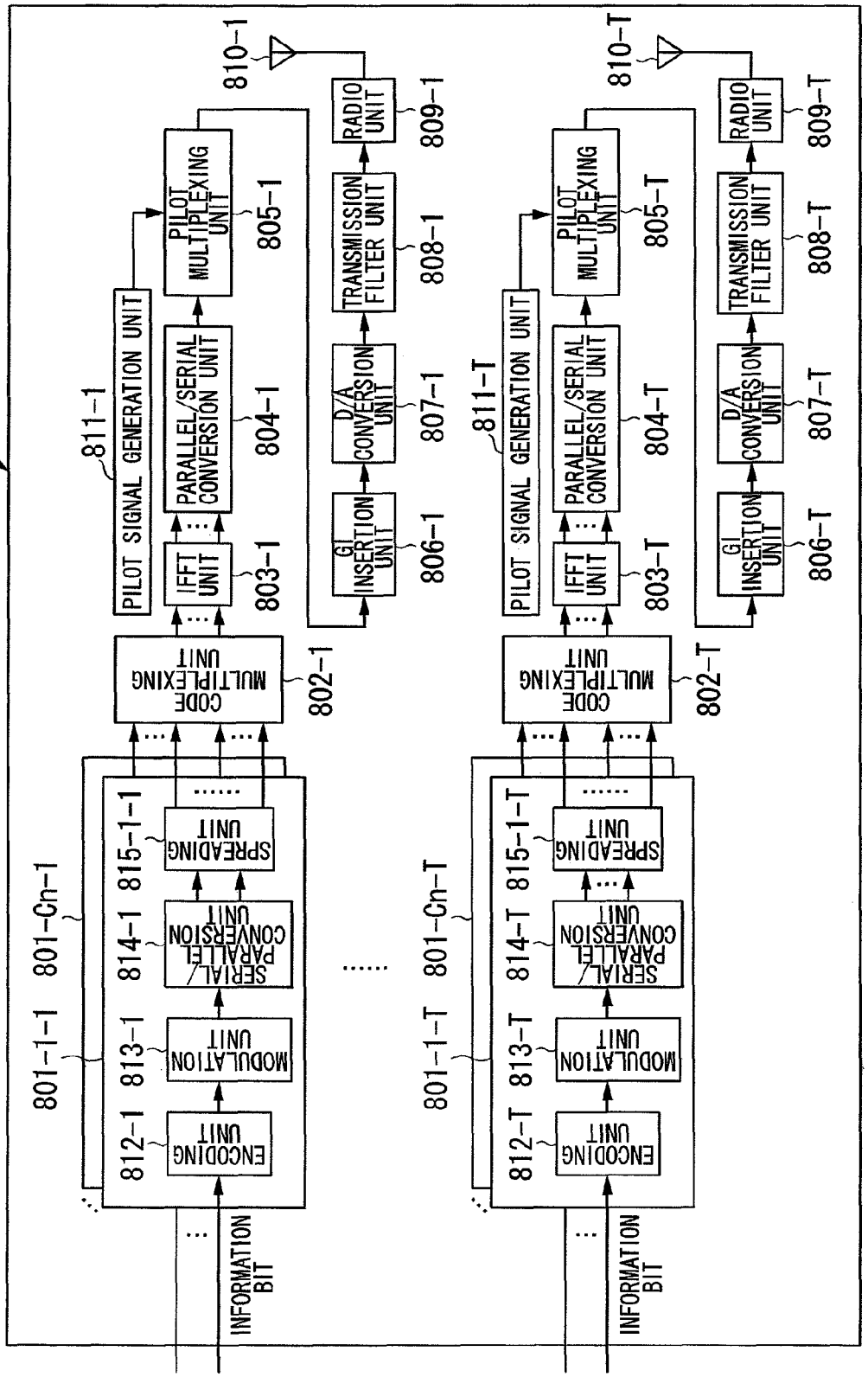
FIG. 8 is a schematic block diagram showing a radio transmission device 800 according to a third embodiment of the present invention.

FIG. 8 is a schematic block diagram showing the configuration of the radio transmission device 800 according to the third embodiment of the present invention. The radio transmission device 800 includes code channel signal generation units 801-1-1 to 801-Cn-1, . . . , and 801-1-T to 801-Cn-T, code multiplexing units 802-1 to 802-T, IFFT units 803-1 to 803-T, parallel/serial conversion units 804-1 to 804-T, pilot multiplexing units 805-1 to 805-T, GI insertion units 806-1 to 806-T, D/A conversion units 807-1 to 807-T, transmission filter units 808-1 to 808-T, radio units 809-1 to 809-T, transmission antennas 810-1 to 810-T, and a pilot signal generation unit 811-1.

The code channel signal generation units 801-1-1 to 801-Cn-1, . . . , and 801-1-T to 801-Cn-T respectively include encoding units 812-1 to 812-Cn, modulation units 813-1 to 813-Cn, serial/parallel conversion units 814-1 to 814-Cn, and spreading units 815-1-1 to 815-Cn-1, . . . , and 815-1-T to 815-Cn-T.

The encoding units 812-1 to 812-Cn (not shown) perform error correction coding for information bits input to the code channel signal generation units 801-1-1 to 801-Cn-1, and output the coded bits to the modulation units 813-1 to 813-Cn (not shown).

The modulation units 813-1 to 813-Cn map signals output by the encoding units 812-1 to 812-Cn to modulation symbols and output the modulation symbols to the serial/parallel conversion units 814-1 to 814-Cn (not shown).

The serial/parallel conversion units 814-1 to 814-Cn perform serial-to-parallel conversion processes for signals output by the modulation units 813-1 to 813-Cn, and output parallel signals to the spreading units 815-1-1 to 815-Cn-1 (not shown).

The spreading units 815-1-1 to 815-Cn-1 spread the signals output by the serial/parallel conversion units 814-1 to 814-Cn using corresponding spreading codes, and output the spread signals to the code multiplexing unit 802-1.

The code multiplexing unit 802-1 code-multiplexes signals output by the code channel signal generation units 801-1-1 to 801-Cn-1, and outputs the code-multiplexed signals to the IFFT unit 803-1.

The IFFT unit 803-1 converts the signals output by the code multiplexing unit 802-1 from frequency domain signals into time domain signals, and outputs the converted signals to the parallel/serial conversion unit 804-1.

The parallel/serial conversion unit 804-1 performs a parallel-to-serial conversion process for the signals output by the IFFT unit 803-1, and outputs a serial signal to the pilot multiplexing unit 805-1.

The pilot multiplexing unit 805-1 multiplexes a pilot signal generated by the pilot signal generation unit 811-1 into the signal output by the parallel/serial conversion unit 804-1, and outputs the multiplexed signal to the GI insertion unit 806-1.

The GI insertion unit 806-1 inserts a GI into the signal output by the pilot multiplexing unit 805-1, and outputs the signal to the D/A conversion unit 807-1.

The D/A conversion unit 807-1 converts the signal output by the GI insertion unit 806-1 from a digital signal into an analog signal, and outputs the analog signal to the transmission filter unit 808-1.

The transmission filter unit 808-1 shapes a waveform of the signal output by the D/A conversion unit 807-1 and outputs the waveform-shaped signal to the radio unit 809-1.

The radio unit 809-1 converts the signal output by the transmission filter unit 808-1 into a radio frequency, and outputs the converted signal to the transmission antenna 810-1.

The transmission antenna 810-1 transmits the signal output by the radio unit 809-1 to the radio reception device 900.

Multiple (T) transmission signals generated as described above are transmitted from the multiple transmission antennas 810-1 to 810-T.

Since the encoding units 812-2 (not shown) to 812-T, the modulation units 813-2 (not shown) to 813-T, the serial/parallel conversion units 814-2 (not shown) to 814-T, 815-1-2 (not shown) to 815-Cn-2 (not shown), . . . , and 815-1-T to 815-Cn-T (not shown), the code multiplexing units 802-2 (not shown) to 802-T, the IFFT units 803-2 (not shown) to 803-T, the parallel/serial conversion units 804-2 (not shown) to 804-T, the pilot multiplexing units 805-2 (not shown) to 805-T, the GI insertion units 806-2 to 806-T, the D/A conversion units 807-2 (not shown) to 807-T, the transmission filter units 808-2 (not shown) to 808-T, the radio units 809-2 (not shown) to 809-T, and the transmission antennas 810-2 (not shown) to 810-T are the same as the encoding unit 812-1, the modulation unit 813-1, the serial/parallel conversion unit 814-1, the spreading units 815-1-1 to 815-Cn-1, the code multiplexing unit 802-1, the IFFT unit 803-1, the parallel/serial conversion unit 804-1, the pilot multiplexing unit 805-1, the GI insertion unit 806-1, the D/A conversion unit 807-1, the transmission filter units 808-1, the radio unit 809-1, and the transmission antenna 810-1, description thereof is omitted.

Figure 9:
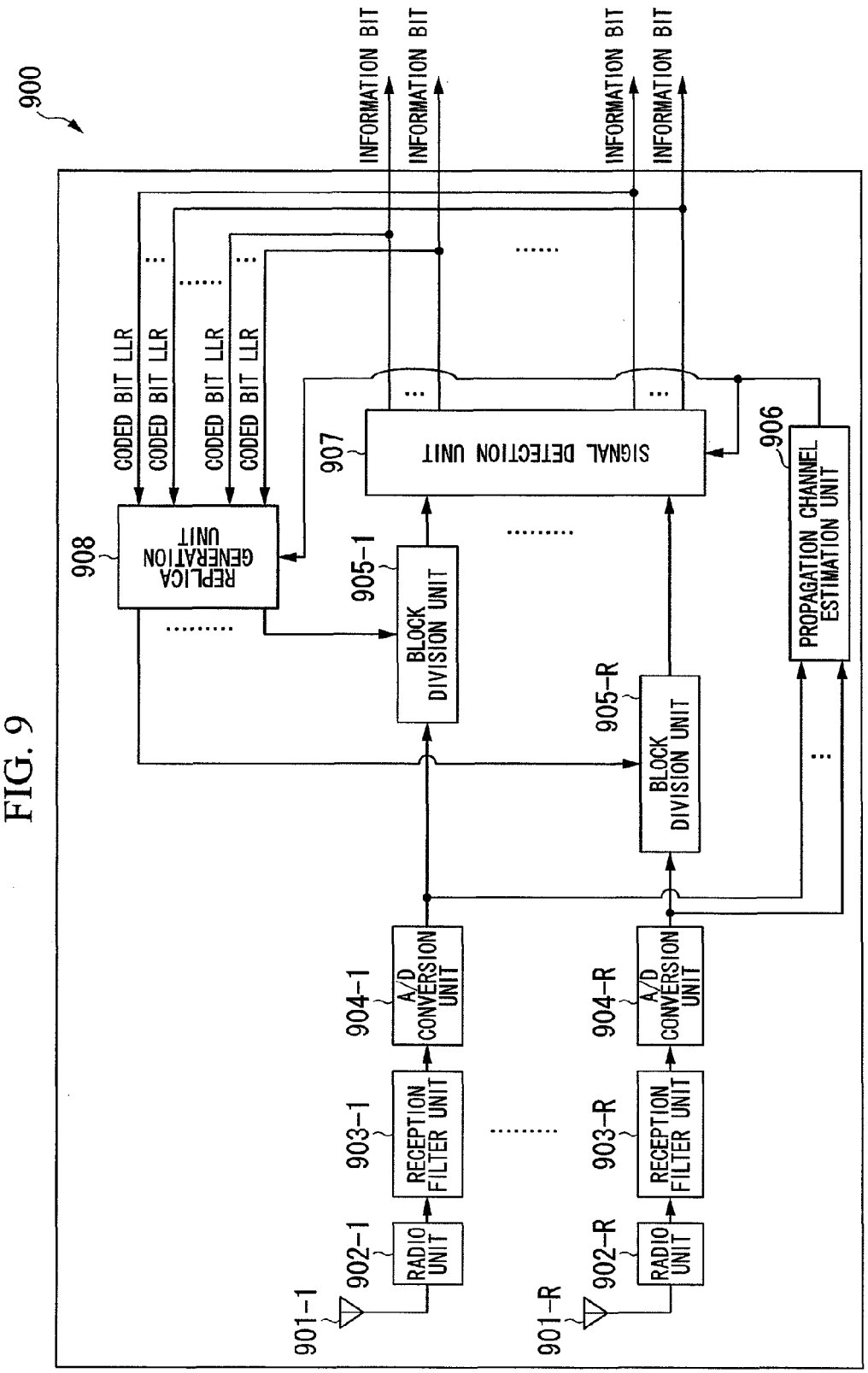
FIG. 9 is a schematic block diagram showing a radio reception device 900 according to the third embodiment of the present invention.

FIG. 9 is a schematic block diagram showing the configuration of the radio reception device 900 according to the third embodiment of the present invention. The radio reception device 900 includes reception antennas 901-1 to 901-R, radio units 902-1 to 902-R, reception filter units 903-1 to 903-R, A/D conversion units 904-1 to 904-R, block division units 905-1 to 905-R, a propagation channel estimation unit 906, a signal detection unit 907, and a replica generation unit 908.

The reception antenna 901-1 receives a signal transmitted by the radio transmission device 800 (FIG. 8), and outputs the received signal to the radio unit 902-1.

The radio unit 902-1 converts the signal output by the reception antenna 901-1 from a radio frequency into a baseband signal, and outputs the baseband signal to the reception filter unit 903-1.

The reception filter unit 903-1 shapes a waveform of the signal output by the radio unit 902-1, and outputs the waveform-shaped signal to the A/D conversion unit 904-1.

The A/D conversion unit 904-1 converts the signal output by the reception filter unit 903-1 from an analog signal into a digital signal, and outputs the digital signal to the block division unit 905-1 and the propagation channel estimation unit 906.

The block division unit 905-1 performs a block division process and an interference cancellation process for the signal output by the A/D conversion unit 904-1 using a replica signal for block division generated by the replica generation unit 908 and an MCI replica signal, and outputs the processed signal to the signal detection unit 907. Since the configuration of the block division unit 905-1 is the same as the block division unit 205-1-1 (FIG. 2) described with reference to the first embodiment, description thereof is omitted.

Since the configurations of the reception antennas 901-2 (not shown) to 901-R, the radio units 902-2 (not shown) to 902-R, the reception filter units 903-2 (not shown) to 903-R, the A/D conversion units 904-2 (not shown) to 904-R, and the block division units 905-2 (not shown) to 905-R are the same as those of the reception antenna 901-1, the radio unit 902-1, the reception filter unit 903-1, the A/D conversion unit 904-1, and the block division unit 905-1, description thereof is omitted.

Figure 10:
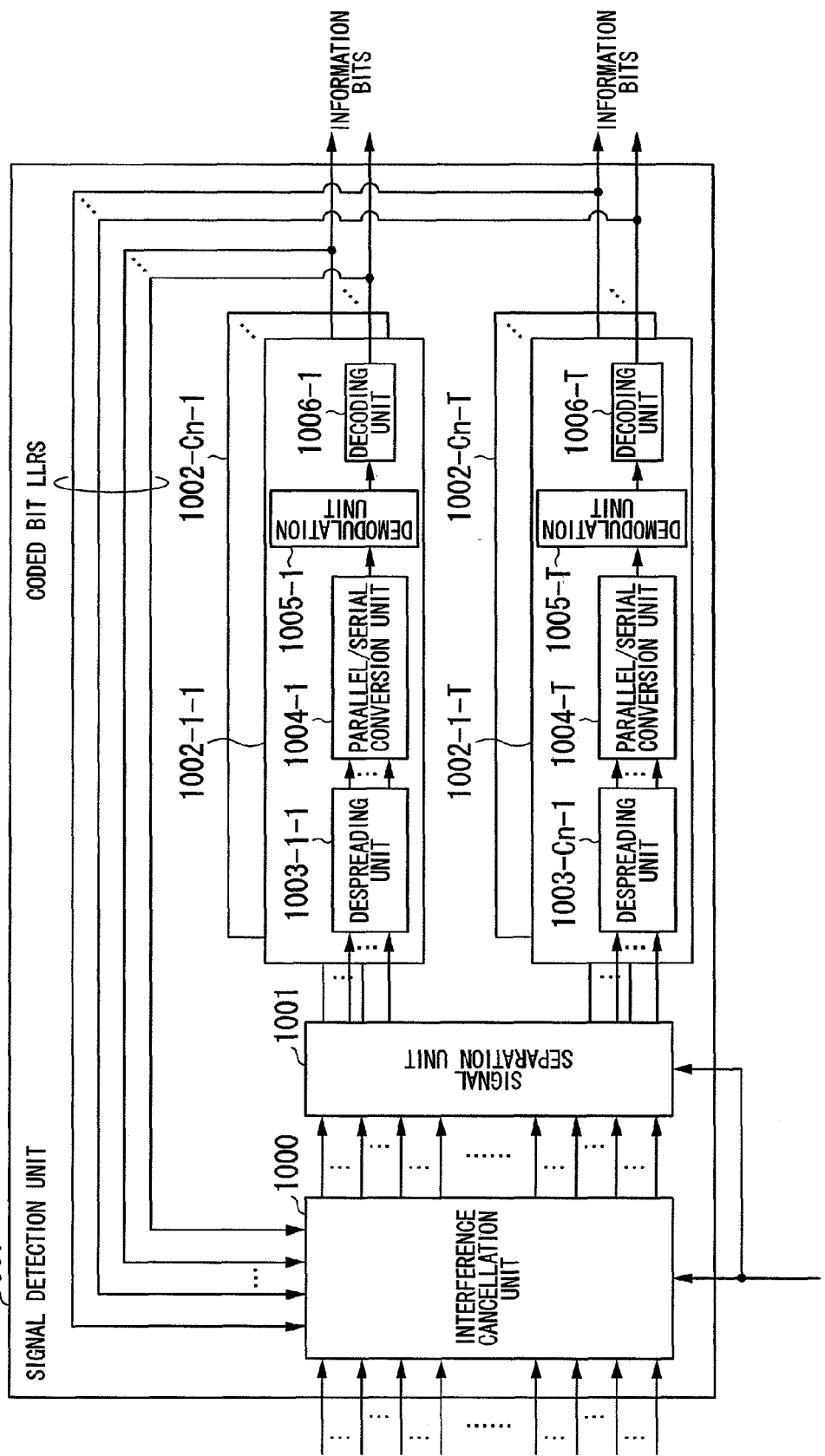
FIG. 10 is a schematic block diagram showing the configuration of a signal detection unit 907 of the radio reception device 900 according to the third embodiment of the present invention.

FIG. 10 shows the configuration of the signal detection unit 907 of the radio reception device 900 according to the third embodiment of the present invention. The signal detection unit 907 includes an interference cancellation unit 1000, a signal separation unit 1001, and code channel signal detection units 1002-1-1 to 1002-Cn-1, . . . , and 1002-1-T to 1002-Cn-T.

The code channel signal detection units 1002-1-1 to 1002-Cn-1, ..., and 1002-1-T to 1002-Cn-T include despreading units 1003-1-1 to 1003-Cn-1, ..., and 1003-1-T to 1003-Cn-T, parallel/serial conversion units 1004-1 to 1004-T, demodulating units 1005-1 to 1005-T, and decoding units 1006-1 to 1006-T.

The interference cancellation unit 1000 generates multicode interference replicas based on coded bit LLRs obtained from the decoding units 1006-1 to 1006-T, removes interference from signals output by the block division units 905-1 to 905-R, and outputs the signals to the signal separation unit 1001.

The signal separation unit 1001 separates the signals output by the interference cancellation unit 1000 into T series by using weights of ZF, MMSE, or the like, and outputs the separated signals to the despreading units 1003-1-1 to 1003-Cn-1, ..., and 1003-1-T to 1003-Cn-T.

The despreading unit 1003-1-1 performs a despreading process for the signals output by the signal separation unit 1001 using corresponding spreading codes, and outputs the spread signals to the parallel/serial conversion unit 1004-1.

The parallel/serial conversion unit 1004-1 performs a parallel-to-serial conversion process for the signals output by the despreading unit 1003-1-1, and outputs a serial signal to the demodulating unit 1005-1.

The demodulating unit 1005-1 performs a demodulation process for the signal output by the parallel/serial conversion unit 1004-1, and outputs the demodulated signal to the decoding unit 1006-1.

The decoding unit 1006-1 performs an error correction decoding process for the signal output by the demodulating unit 1005-1. The decoding unit 1006-1 outputs a coded bit LLR to the replica generation unit 908 after the error correction decoding process.

Since the configurations of the despreading units 1003-2-1 (not shown) to 1003-Cn-T (not shown), the parallel/serial conversion units 1004-2 (not shown) to 1004-T, the demodulating units 1005-2 (not shown) to 1005-T, and the decoding units 1006-2 (not shown) to 1006-T are the same as the despreading unit 1003-1-1, the parallel/serial conversion unit 1004-1, the demodulating unit 1005-1, and the decoding unit 1006-1, description thereof is omitted.

Figure 11:
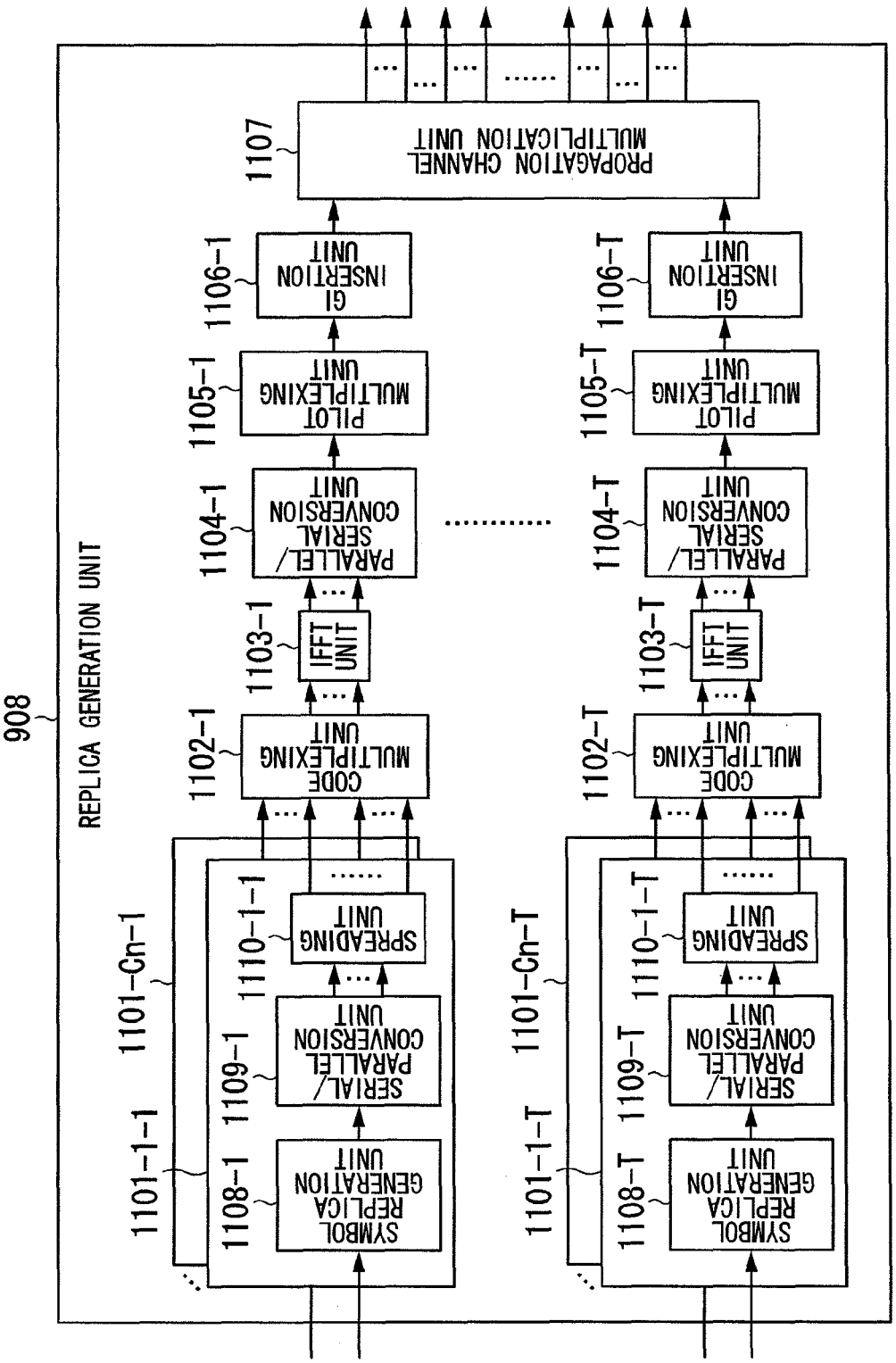
FIG. 11 is a schematic block diagram showing the configuration of a replica generation unit 908 of the radio reception device 900 according to the third embodiment of the present invention.
Figure 12:
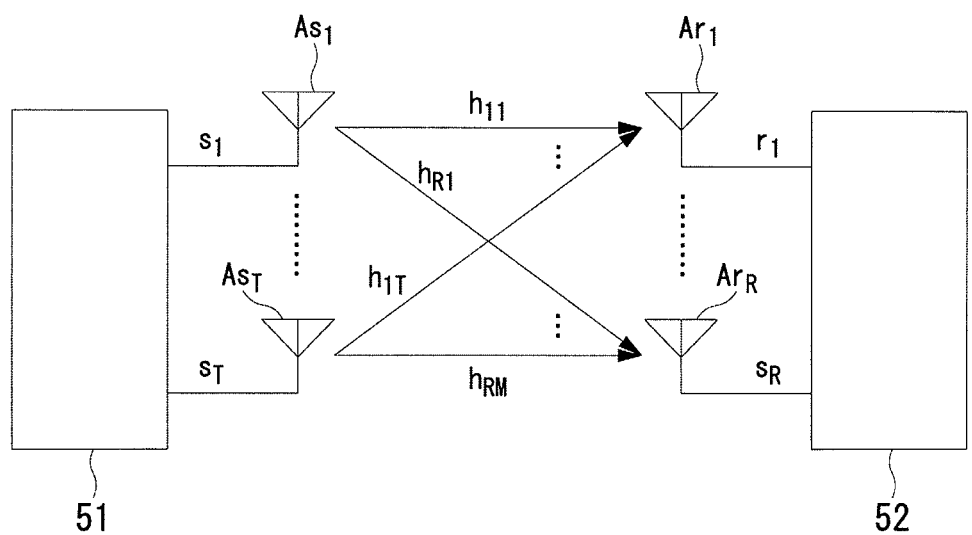
FIG. 12 is a schematic diagram showing a conventional MIMO system.

FIG. 11 is a schematic block diagram showing the configuration of the replica generation unit 908 of the radio reception device 900 according to the third embodiment of the present invention. The replica generation unit 908 includes code channel signal generation units 1101-1-1 to 1101-Cn-1, ..., and 1101-1-T to 1101-Cn-T, code multiplexing units 1102-1 to 1102-T, IFFT units 1103-1 to 1103-T, parallel/serial conversion units 1104-1 to 1104-T, pilot multiplexing units 1105-1 to 1105-T, GI insertion units 1106-1 to 1106-T, and a propagation channel multiplication unit 1107.

The code channel signal generation units 1101-1-1 to 1101-Cn-1, ..., and 1101-1-T to 1101-Cn-T include symbol replica generation units 1108-1 to 1108-T, serial/parallel conversion units 1109-1 to 1109-T, and spreading units 1110-1-1 to 1110-Cn-1, ..., and 1110-1-T to 1110-Cn-T.

The symbol replica generation unit 1108-1 generates a replica of a modulation symbol based on a signal output by the signal detection unit 907 (FIG. 9), and outputs the generated replica to the serial/parallel conversion unit 1109-1.

The serial/parallel conversion unit 1109-1 performs a serial-to-parallel conversion process for a signal output by the symbol replica generation unit 1108-1, and outputs parallel signals to the spreading unit 1110-1-1.

The spreading unit 1110-1-1 performs a spreading process for the signals output by the serial/parallel conversion unit 1109-1 using corresponding spreading codes, and outputs the spread signals to the code multiplexing unit 1102-1.

The code multiplexing unit 1102-1 code-multiplexes signals generated by the code channel replica generation units 1101-1-1 to 1101-Cn-1, and outputs the code-multiplexed signals to the IFFT unit 1103-1.

The IFFT unit 1103-1 converts the signals output by the code multiplexing unit 1102-1 from frequency domain signals to time domain signals, and outputs the time domain signals to the parallel/serial conversion unit 1104-1. The parallel/serial conversion unit 1104-1 performs a parallel-to-serial conversion process for the signals output by the IFFT unit 1103-1, and outputs a serial signal to the pilot multiplexing unit 1105-1.

The pilot multiplexing unit 1105-1 multiplexes a pilot signal into the signal output by the parallel/serial conversion unit 1104-1, and outputs the multiplexed signal to the GI insertion unit 1106-1. The GI insertion unit 1106-1 inserts a GI into the signal output by the pilot multiplexing unit 1105-1, and outputs the signal to the propagation channel multiplication unit 1107.

Since the configurations of the symbol replica generation units 1108-2 (not shown) to 1108-T, the serial/parallel conversion units 1109-2 (not shown) to 1109-T, the spreading units 1110-2-1 (not shown) to 1110-Cn-T (not shown), the code multiplexing units 1102-2 (not shown) to 1102-T, the IFFT units 1103-2 (not shown) to 1103-T, the parallel/serial conversion units 1104-2 (not shown) to 1104-T, the pilot multiplexing units 1105-2 (not shown) to 1105-T, and the GI insertion units 1106-2 (not shown) to 1106-T are the same as those of the symbol replica generation unit 1108-1, the serial/parallel conversion unit 1109-1, the spreading unit 1110-1-1, the code multiplexing unit 1102-1, the IFFT unit 1103-1, the parallel/serial conversion unit 1104-1, the pilot multiplexing unit 1105-1, and the GI insertion unit 1106-1, description thereof is omitted.

In the communication system according to the third embodiment of the present invention, the radio transmission device 800 (also referred to as a transmission device) includes multiple transmission antennas 810-1 to 810-T. The radio units 809-1 to 809-T (also referred to as transmission units) transmit transmission signals from the multiple transmission antennas 810-1 to 810-T to the radio reception device 900 (also referred to as a reception device).

The radio reception device 900 includes at least one reception antenna 901-1 to 901-R which receives transmission signals transmitted by the radio units 809-1 to 809-T of the radio transmission device 800. The signal detection unit 907 (also referred to as a likelihood calculation unit) calculates bit likelihoods from reception signals received by the reception antennas 901-1 to 901-R. The propagation channel estimation unit 906 (also referred to as a propagation channel response estimation unit) estimates propagation channel responses among the multiple transmission antennas 810-1 to 810-T of the radio transmission device 800 and the reception antennas 901-1 to 901-R of the radio reception device 900. The replica generation unit 908 (also referred to as a reception replica signal generation unit) generates reception replica signals based on the propagation channel responses estimated by the propagation channel estimation unit 906 and the bit likelihoods calculated by the signal detection unit 907. Using the reception replica signals generated by the replica generation unit 908, the block division units 905-1 to 905-R divide a reception signal of at least one of the reception antennas 901-1 to 901-R into multiple blocks. The signal detection unit 907 (also referred to as a transmission signal detection unit) detects the transmission signals transmitted by the radio transmission device 800 based on the reception signals divided by the block division units 905-1 to 905-R into the multiple blocks and the propagation channel responses estimated by the propagation channel estimation unit 906.

The signal detection unit 907 of this embodiment includes the interference cancellation unit 1000 and the signal separation unit 1001. An interference replica is generated from a bit likelihood calculated by the signal detection unit 907 and is removed by the interference cancellation unit 1000. The signal separation unit 1001 separates a signal into which a transmission signal is multiplexed from an output of the interference cancellation unit 1000.

The signal detection unit 907 includes the despreading units 1003-1-1 to 1003-Cn-T and the demodulation units 1005-1 to 1005-T. The despreading units 1003-1-1 to 1003-Cn-T perform despreading processes for signals produced by the signal separation unit 1001. The demodulation units 1005-1 to 1005-T calculate bit likelihoods from the signals despread by the despreading units 1003-1-1 to 1003-Cn-T.

Using an MCI canceller in the third embodiment, the performance of a block division process is improved and the performance of reception is improved.

The case where a PIC is used in an interference canceller in the above-described second or third embodiment has been described, but the present invention is not limited thereto. For example, a successive interference canceller (SIC) may be used.

The MIMO interference canceller and the MCI canceller respectively described in the above-described second or third embodiment may be simultaneously used.

In the above-described embodiment, a program for implementing functions of respective parts of the radio transmission device or the radio reception device according to the first to third embodiments may be recorded on a computer readable recording medium. Control of respective parts of the radio transmission device or the radio reception device may be executed by enabling a computer system to read and execute the program recorded on the recording medium. The "computer system" used herein includes an OS and hardware, such as peripheral devices.

The "computer readable recording medium" may be a portable medium such as a flexible disc, a magneto-optical disc, a ROM or CD-ROM, or a storage device, such as a hard disk, built into the computer system. Furthermore, the "computer readable recording medium" may also include a medium that dynamically holds a program for a short period of time, such as a communication line when a program is transmitted via a network such as the Internet or a communication network such as a telephone network, or a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

Industrial Applicability

The present invention is applicable to a communication system, a reception device, and a communication method of the present invention that can obtain good transmission characteristics between the transmission device and the reception device without increasing the number of reception antennas of the reception device.

| Reference Symbols | |
|---|---|
| 100: | Radio transmission device |
| 101-1 to 101-T: | Encoding unit |
| 102-1 to 102-T: | Modulation unit |
| 103-1 to 103-T: | Serial/parallel conversion unit |
| 104-1 to 104-T: | IFFT unit |
| 105-1 to 105-T: | Parallel/serial conversion unit |
| 106-1 to 106-T: | Pilot multiplexing unit |
| 107-1 to 107-T: | GI insertion unit |
| 108-1 to 108-T: | D/A conversion unit |
| 109-1 to 109-T: | Transmission filter unit |
| 110-1 to 110-T: | Radio unit |
| 111-1 to 111-T: | Transmission antenna |
| 112: | Pilot signal generation unit |
| 200: | Radio reception device |
| 201-1 to 201-R: | Reception antenna |
| 202-1 to 202-R: | Radio unit |
| 203-1 to 203-R: | Reception filter unit |
| 204-1 to 204-R: | A/D conversion unit |
| 205-1-1 to 205-R-$N_R$: | Block division unit |
| 206: | Propagation channel estimation unit |
| 207: | Signal detection unit |
| 208: | Replica generation unit |
| 209-1-1: | Adder |
| 210-1-1: | GI removal unit |
| 211-1-1: | Serial/parallel conversion unit |
| 212-1-1: | FFT unit |
| 600: | Radio reception device |
| 601-1 to 601-R: | Reception antenna |
| 602-1 to 602-R: | Radio unit |
| 603-1 to 603-R: | Reception filter unit |
| 604-1 to 604-R: | A/D conversion unit |
| 605-1 to 605-R: | Block division unit |
| 606: | Propagation channel estimation unit |
| 607: | Signal detection unit |
| 608: | Replica generation unit |
| 800: | Radio transmission unit |
| 801-1-1 to 801-Cn-T: | Code channel signal generation unit |
| 802-1 to 802-T: | Code multiplexing unit |
| 803-1 to 803-T: | IFFT unit |
| 804-1 to 804-T: | Parallel/serial conversion unit |
| 805-1 to 805-T: | Pilot multiplexing unit |
| 806-1 to 806-T: | GI insertion unit |
| 807-1 to 807-T: | D/A conversion unit |
| 808-1 to 808-T: | Transmission filter unit |
| 809-1 to 809-T: | Radio unit |
| 810-1 to 810-T: | Transmission antenna |
| 812-1 to 812-Cn: | Encoding unit |
| 813-1 to 813-Cn: | Modulation unit |
| 814-1 to 814-Cn: | Serial/parallel conversion unit |
| 815-1-1 to 815-Cn-T: | Spreading unit |
| 900: | Radio reception device |
| 901-1 to 901-R: | Reception antenna |
| 902-1 to 902-R: | Radio unit |
| 903-1 to 903-R: | Reception filter unit |
| 904-1 to 904-R: | A/D conversion unit |
| 905-1 to 905-R: | Block division unit |
| 906: | Propagation channel estimation unit |
| 907: | Signal detection unit |
| 908: | Replica generation unit |

The invention claimed is:

1. A communication system comprising a transmission device and a reception device, wherein the transmission device comprises:

multiple transmission antennas; and a transmission unit which transmits multiple transmission signals from the multiple transmission antennas to the reception device, and the reception device comprises:

at least one reception antenna which receives the multiple transmission signals transmitted by the transmission unit;

a propagation channel response estimation unit which estimates propagation channel responses among the multiple transmission antennas and the reception antenna;

a block division unit which divides a reception signal of at least one of the reception antennas into multiple blocks based on a multipath; and a transmission signal detection unit which detects the transmission signals transmitted by the transmission device based on the reception signal divided by the block division unit into the multiple blocks and the propagation channel responses estimated by the propagation channel response estimation unit, wherein the transmission signal detection unit comprises:

an interference cancellation unit which generates and removes an interference replica; and a signal separation unit which separates a signal into which a transmission signal is multiplexed from an output of the interference cancellation unit.

2. A reception device which communicates with a transmission device comprising multiple transmission antennas, the reception device comprising:

at least one reception antenna which receives multiple transmission signals transmitted by the transmission device from the multiple transmission antennas;

a propagation channel response estimation unit which estimates propagation channel responses among the multiple transmission antennas and the reception antenna;

a block division unit which divides a reception signal of at least one of the reception antennas into multiple blocks based on a multipath; and a transmission signal detection unit which detects the transmission signals transmitted by the transmission device based on the reception signal divided by the block division unit into the multiple blocks and the propagation channel responses estimated by the propagation channel response estimation unit, wherein the transmission signal detection unit comprises:

an interference cancellation unit which generates and removes an interference replica; and a signal separation unit which separates a signal into which a transmission signal is multiplexed from an output of the interference cancellation unit.

3. The reception device according to claim 2, further comprising:

a likelihood calculation unit which calculates bit likelihoods from the reception signal received by the reception antenna; and a reception replica signal generation unit which generates reception replica signals based on the propagation channel responses estimated by the propagation channel response estimation unit and the bit likelihoods calculated by the likelihood calculation unit, wherein the block division unit divides the reception signal of the at least one of the reception antennas into the multiple blocks based on the multipath by using the reception replica signals generated by the reception replica signal generation unit.

4. The reception device according to claim 2, wherein the interference cancellation unit generates and removes interference replicas from the bit likelihoods.

5. The reception device according to claim 2, wherein the transmission signal is spread and code-multiplexed, and the transmission signal detection unit comprises:

a despreading unit which despreads signals produced by the signal separation unit; and a demodulation unit which calculates bit likelihoods from the despread signals.

6. The reception device according to claim 2, wherein the interference cancellation unit generates and removes at least one of the multiple transmission signals transmitted by the transmission device as an interference replica.

7. The reception device according to claim 5, wherein the interference cancellation unit generates and removes at least one of code-multiplexed signals as an interference replica.

8. The reception device according to claim 5, wherein the interference cancellation unit generates and removes at least one of the multiple transmission signals transmitted by the transmission device and at least one of code-multiplexed signals as an interference replica.

9. A communication method for use in a reception method using a reception device which receives multiple transmission signals transmitted from a transmission device comprising multiple transmission antennas by at least one reception antenna, the communication method comprising:

estimating propagation channel responses among the multiple transmission antennas and the reception antenna;

dividing a reception signal of at least one of the reception antennas into multiple blocks based on a multipath; and detecting the transmission signals transmitted by the transmission device based on the reception signal divided in the division and the propagation channel responses estimated in the estimation, wherein the detection comprises:

generating and removing an interference replica; and separating a signal into which a transmission signal is multiplexed from an output of the generation and removal.

10. The communication method according to claim 9, wherein the division and the detection are iterated.

* * * * *